(12) United States Patent
Lipton

(10) Patent No.: US 12,473,950 B2
(45) Date of Patent: Nov. 18, 2025

(54) AXIAL AUXETIC STRUCTURES

(71) Applicant: UNIVERSITY OF WASHINGTON, Seattle, WA (US)

(72) Inventor: Jeffrey Lipton, Seattle, WA (US)

(73) Assignee: UNIVERSITY OF WASHINGTON, Seattle, WA (US)

( * ) Notice: Subject to any disclaimer, the term of this patent is extended or adjusted under 35 U.S.C. 154(b) by 648 days.

(21) Appl. No.: 17/759,826

(22) PCT Filed: Jan. 29, 2021

(86) PCT No.: PCT/US2021/070099
§ 371 (c)(1),
(2) Date: Jul. 29, 2022

(87) PCT Pub. No.: WO2021/155409
PCT Pub. Date: Aug. 5, 2021

(65) Prior Publication Data
US 2023/0112650 A1    Apr. 13, 2023

Related U.S. Application Data

(60) Provisional application No. 62/967,866, filed on Jan. 30, 2020.

(51) Int. Cl.
*F16D 3/16* (2006.01)
*B29D 22/04* (2006.01)

(52) U.S. Cl.
CPC .............. *F16D 3/16* (2013.01); *B29D 22/04* (2013.01)

(58) Field of Classification Search
None
See application file for complete search history.

(56) References Cited

U.S. PATENT DOCUMENTS

| | | | |
|---|---|---|---|
| 7,910,193 | B2 | 3/2011 | Ma |
| 8,652,602 | B1 | 2/2014 | Dolla |
| 10,442,132 | B1 | 10/2019 | Amano |
| 2011/0168313 | A1 | 7/2011 | Ma |
| 2017/0215284 | A1 | 7/2017 | Ng |
| 2018/0061743 | A1 | 3/2018 | Hsu |

(Continued)

FOREIGN PATENT DOCUMENTS

| | | |
|---|---|---|
| CN | 102529583 | 7/2012 |
| CN | 110165929 | 8/2019 |

(Continued)

OTHER PUBLICATIONS

Thurston, B., 1992. The orbifold notation for surface groups. Groups Comb. Geom, 165, p. 438-447. (Year: 1992).*

(Continued)

*Primary Examiner* — Elizabeth Collister
(74) *Attorney, Agent, or Firm* — Bradley K. Lortz; canady + lortz LLP

(57) ABSTRACT

A novel range of non-shearing axial auxetic structures are disclosed having useful functions and properties. The novel non-shearing axial auxetic structures have applications including compliant universal joints, structures with switchable Poisson ratios, nd multiple discrete dimensional configurations. Further, combination structures of multiple individual non-shearing axial auxetic structures having useful functions and properties are also disclosed.

13 Claims, 29 Drawing Sheets

(56) References Cited

U.S. PATENT DOCUMENTS

| | | |
|---|---|---|
| 2018/0194106 A1 | 7/2018 | Tibbits |
| 2018/0237965 A1 | 8/2018 | Li |
| 2018/0311833 A1 | 11/2018 | Lipton |
| 2018/0317600 A1 | 11/2018 | Campos |

FOREIGN PATENT DOCUMENTS

| | | |
|---|---|---|
| CN | 110360389 | 10/2019 |
| CN | 210482750 | 5/2020 |
| JP | 2019217766 | 12/2019 |
| WO | WO2020146777 | 7/2020 |

OTHER PUBLICATIONS

Ali, Muhammad, Experimental and Numerical Study of Ductile Metal Auxetic Tubular Structures, Virginia Polytechnic Institute and State University, Masters Theses 21422, Jun. 25, 2020. http://hdl.handle.net/10919/99143.

Davini, Cesare, et al., 2017 Smart Mater. Struct. 26 125007 DOI 10.1088/1361-665X/aa9091.

Guo, Youngguang, et al., Deformation behaviors and energy absorption of auxetic lattice cylindrical structures under axial crushing load, Aerospace Science and Technology, vol. 98, 2020, 105662, ISSN 1270-9638, https://doi.org/10.1016/j.ast.2019.105662.

Han, Seolhee, et al., High-performance, biaxially stretchable conductor based on Ag composites and hierarchical auxetic structure, J. Mater. Chem C., 2020, 8, 1556, DOI: 10.1039/c9tc06036g.

Lim, Teik Cheng, "Spherical Auxetic Shells." Advanced Materials Research, vol. 804, Trans Tech Publications, Ltd., Sep. 2013, pp. 146-150. Crossref, doi: 10.4028/www.scientific.net/amr.804.146.

Martin, E., et al., Non-auxetic/auxetic transitions inducing modifications of the magnetic anisotropy in CoFe2O4 thin films, ournal of Alloys and Compounds, vol. 836, 2020, 155425, ISSN 0925-8388, https://doi.org/10.1016/j.jallcom.2020.155425.

Peng, Xiang-Long, et al., Phase contrast mediated switch of auxetic mechanism in composites of infilled re-entrant honeycomb microstructures, Extreme Mechanics Letters, vol. 35, 2020, 100641, ISSN 2352-4316, https://doi.org/10.1016/j.eml.2020.100641.

Ren, Xin, et al., Experiments and parametric studies on 3D metallic auxetic metamaterials with tuneable mechanical properties, 2015 Smart Mater. Struct. 24 095016.

Shufrin, Igor, et al., Hybrid materials with negative Poisson's ratio inclusions, International Journal of Engineering Science, vol. 89, 2015, pp. 100-120, ISSN 0020-7225, https://doi.org/10.1016/j.ijengsci.2014.12.006.

International Search Report and Written Opinion for PCT/US21/70099 (WO2021155409 Published Aug. 5, 2021).

\* cited by examiner

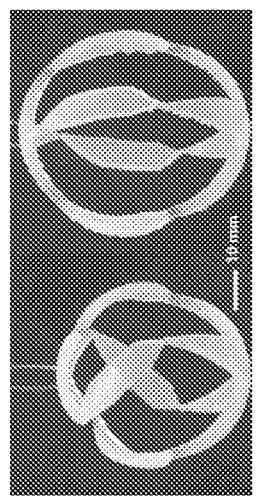
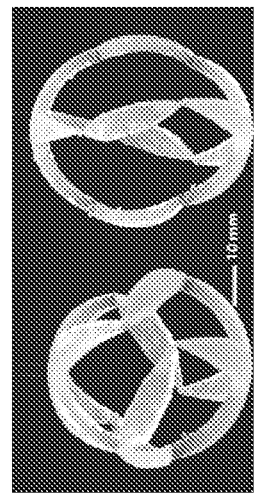
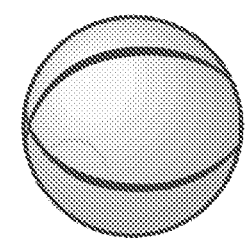
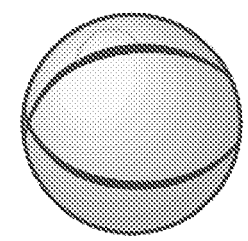
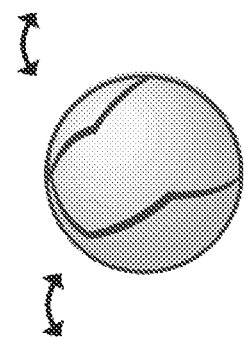
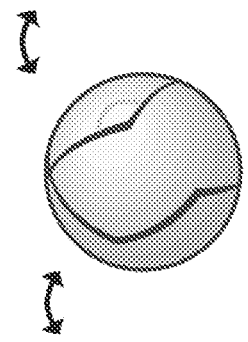
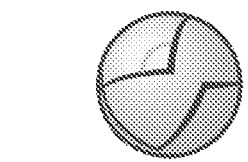
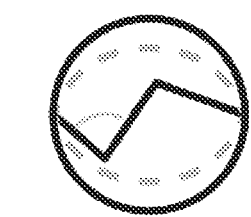
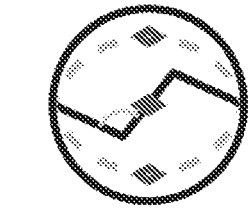
*Prior Art*
FIG. 1A
FIG. 1B
*Prior Art*

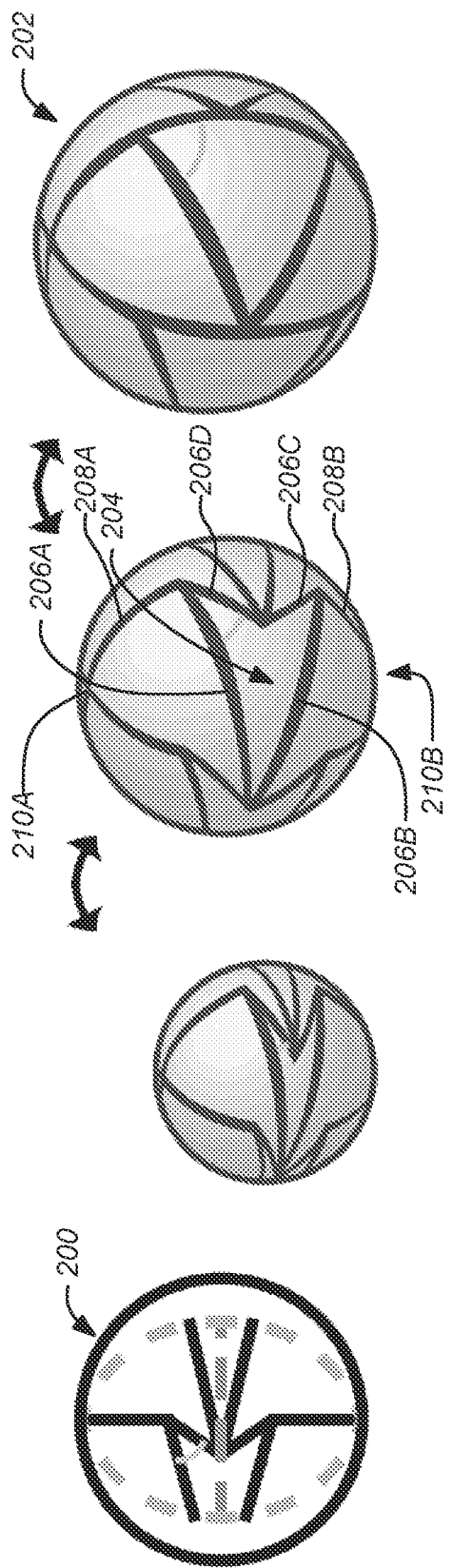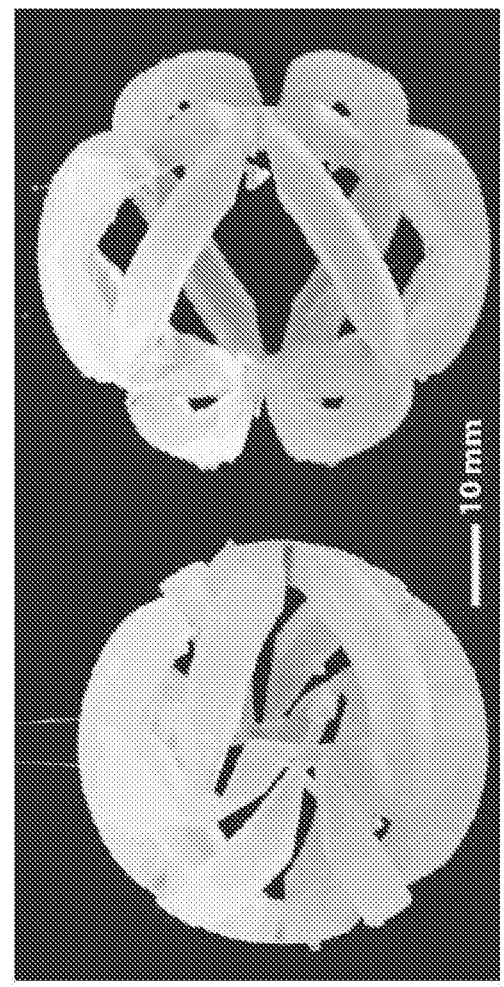
FIG. 2A
FIG. 2B

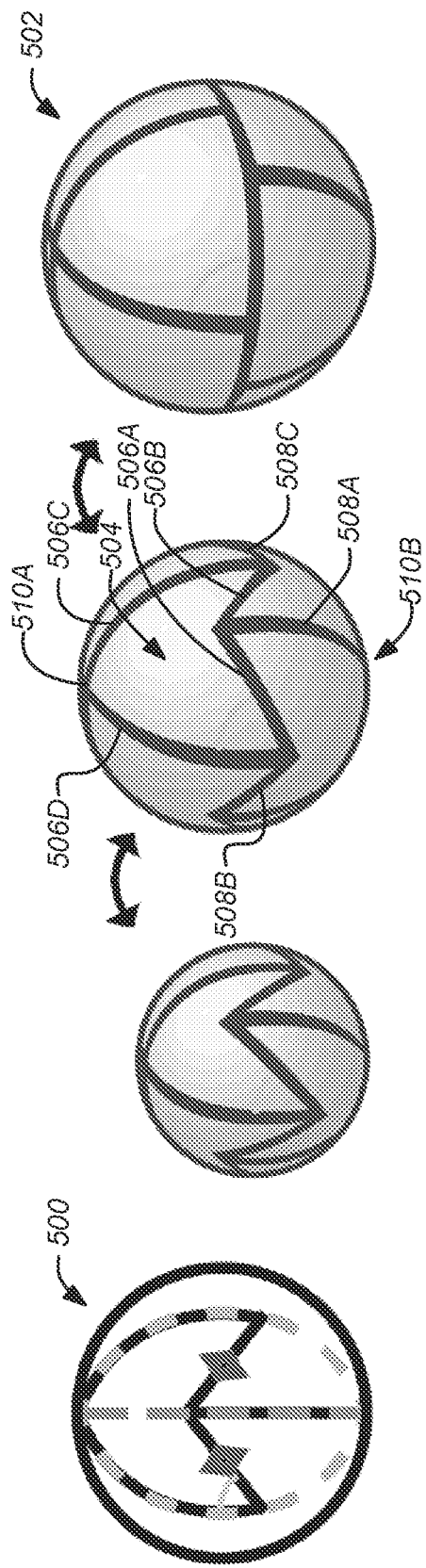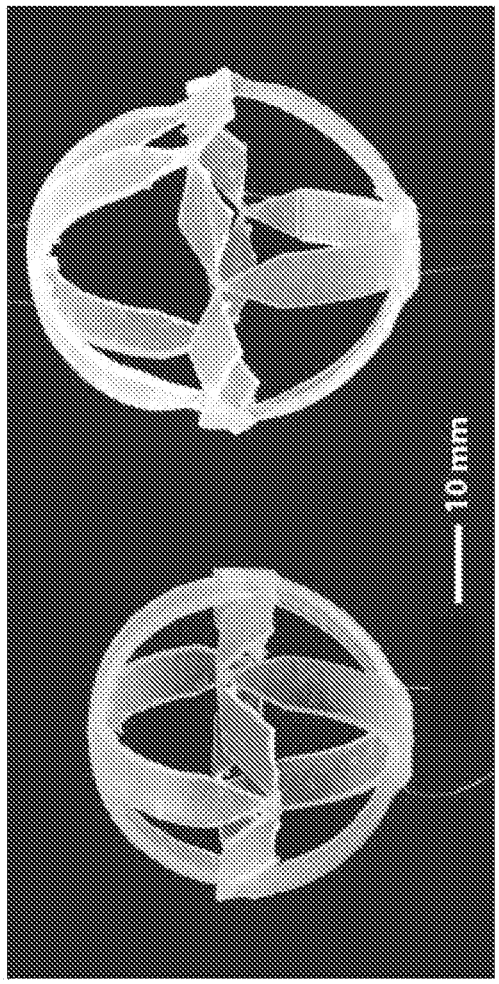
FIG. 5A
FIG. 5B

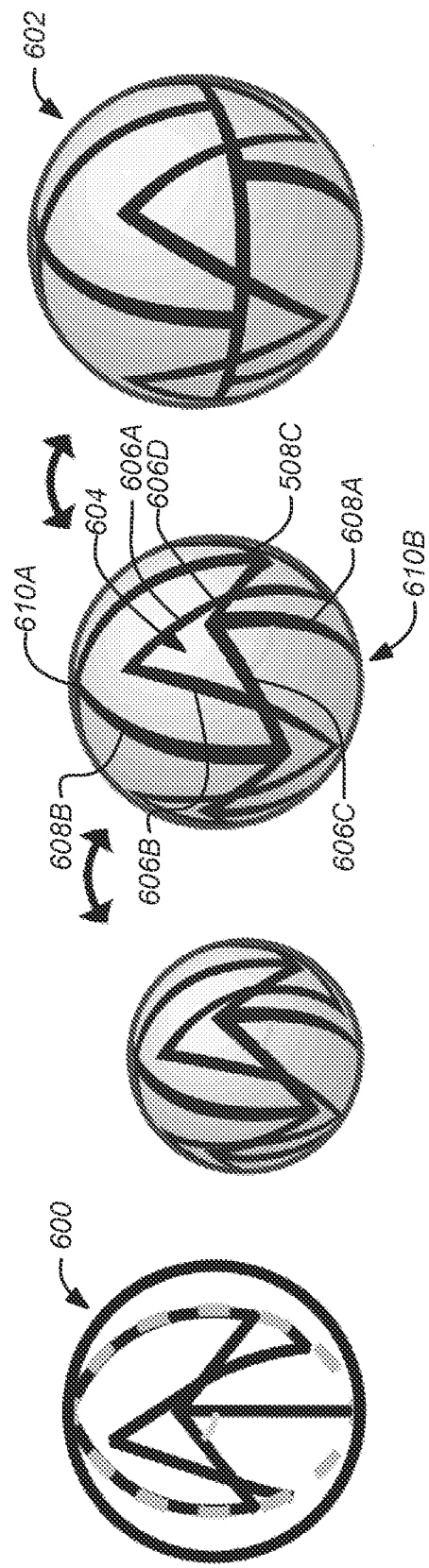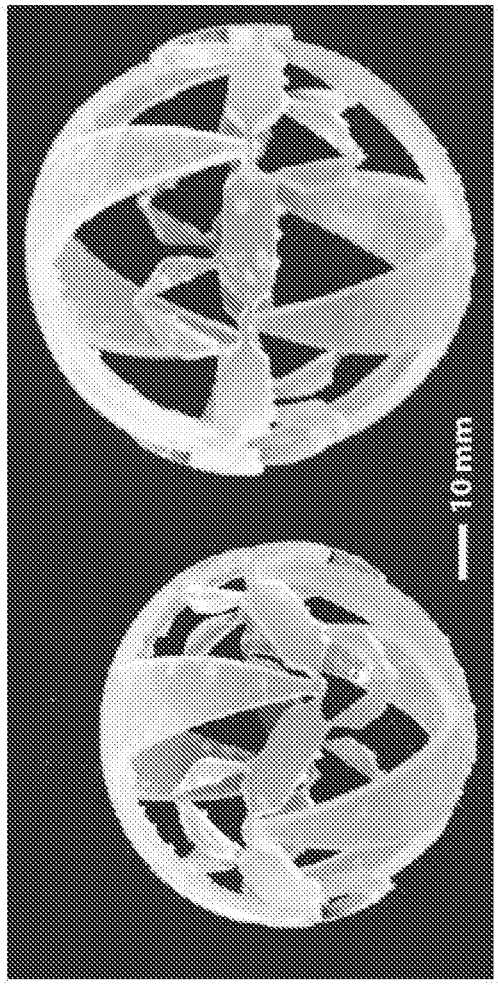
FIG. 6A
FIG. 6B

AXIAL AUXETIC STRUCTURES

CROSS-REFERENCE TO RELATED APPLICATION

This application claims the benefit under 35 U.S.C. § 119(e) of the following U.S. provisional patent application, which is incorporated by reference herein:

U.S. Provisional Patent Application No. 62/967,866, filed Jan. 30, 2020, and entitled "AXIAL AUXETIC STRUCTURES," by Jeffrey Lipton.

BACKGROUND OF THE INVENTION

1. Field of the Invention

The invention is related to auxetics. Particularly, the invention is related to non-shearing axial auxetic structures exhibiting a range of exceptional mechanical properties.

2. Description of the Related Art

Auxetics are structures or material exhibiting a negative Poisson's ratio, i.e. their cross sectional area counterintuitively increases when a longitudinal strain is applied thereto. Auxetics can be modeled as a network of unit cells formed of elements pivotally coupled to one another. These unit cells can be tiled in a periodic pattern to form a two-dimensional surface that can itself form an auxetic structure. The mechanics of the auxetic material and structure are determined by symmetry of the unit cells in the auxetic pattern. In addition, the movement of the elements of a single unit cell and of the auxetic pattern as a whole can be determined by the internal angle between two elements in the unit cells. As the angle between the two elements varies, the areas of all of the unit cells expand or contract.

Typically, conventional auxetic structures are either isotropic or anisotropic. Isotropic auxetic structures can be characterized by a Poisson ratio of −1 and can expand uniformly in a direction perpendicular to the direction of applied tension, whereas anisotropic auxetic structures can be characterized by a Poisson ratio less than zero but greater than −1 and do not expand uniformly in response to tension, Conventional auxetics deform in a predefined manner dictated by the design of the unit cells, the symmetries of the tilings of the unit cells, and the internal angles of their elements. Accordingly, the rigidity or stiffness of conventional auxetics, and the energy required to deform elements or joints of the auxetic structure, are likewise predefined. Conventional auxetics and auxetic structures are therefore limited in that they cannot switch between being rigid and compliant properties. The individual unit cells of the structure may shear locally, but the symmetries of the tiling can result in no net, or global, shearing of the structure.

Shearing auxetic structures are another kind of auxetic structure having a Poisson ratio below zero and where the area of each of the unit cells expands or contracts as each of the unit cells shears, producing a net shear. Shearing auxetics can expand at different rates and in different directions while shearing. Shearing auxetic structures can experience both local and global, or net, shear. For example, there are structures where the unit cells shear as they expand but the net structure does not experience any shear. Such structures can exhibit local but not global, or net, shearing. For example, a structure can experience counterbalanced local shearing that results in no net shearing of the structure (e.g., the oppositely-twisting poles of the Hoberman Twist-O toy). In net shearing structures, each unit cell shears while expanding or contracting and they predominantly shear in the same direction.

Shearing auxetic structures can also be handed or unhanded. Unhanded shearing auxetic structures can be expanded using either of opposed shear forces, depending on their internal angles between elements. In unhanded shearing auxetic structures, further application of force beyond a maximum auxetic extension causes the unit cells to contract. In contrast, handed shearing auxetic, structures expand in response to shear force in a first direction and contract in response to an oppositely directed shear force. In handed shearing auxetic structures deformation beyond a maximum auxetic extension causes the unit cells to cease being auxetic.

Auxetic structures can also be distinguished as either planar or non-planar. Typically, most prior art shearing auxetic tiling patterns for planar surfaces employ surfaces having zero Gaussian curvature, are not mathematically compact, and have no curvature in any direction.

U.S. Patent Application Publication No. 2018/0311833, published Nov. 1, 2018, by Liption et at (Lipton), which is incorporated by reference herein, discloses non-planar shearing auxetic structures, devices, and methods. In some embodiments, a non-planar shearing auxetic structure can include a mathematically compact surface with an auxetic pattern of repeating unit cells. The shearing auxetic structure can have a contracted configuration and an expanded configuration, and, when in the compact configuration, can be configured to move to the expanded configuration while generating a net shear on the surface. Shearing auxetic structures can have handedness and, in some embodiments, multiple handed shearing auxetic structures can be joined to create rigid or semi-rigid composite structures, e.g., by arranging differently-handed structures concentrically wherein two or more structures lock against each other. Handed shearing auxetic structures can also provide actuators to convert rotation or other motion to translation, volume expansion, bending, twisting, etc. These structures have many applications, e.g., deployable structures such as pressure vessels, space habitats, fluid carrying vessels, soft robotics, toys, etc.

There is a need in the art for non-shearing axial structures to afford useful properties in a range of fields. For example, novel non-shearing axial structures can be applied in a number of fields requiring deployable structures, such as aerospace, robotics, oil industry, architectural fields such as construction and tunneling, and even novelty toys. In addition, other fields can benefit from non-shearing axial structures as well. For example, the development of such structures could find applications in robotics in preference to pneumatic, hydraulic, or cable-driven actuators that can be complex and expensive. In view of the foregoing, there is a need in the art for methods and apparatuses having novel mechanical functional properties. There is a need for such methods and apparatuses having bi stable properties effected by twist. There is also a need for such methods and apparatuses to function as universal joints or a bulk material exhibiting weak compression and shear at nodes but resisting twist relative to one another. These and other needs are met by the present invention as described in detail hereafter.

SUMMARY OF THE INVENTION

A novel range of non-shearing, axial auxetic structures are disclosed having useful functions and properties. The novel non-shearing axial auxetic structures have applications including compliant universal joints, structures with switchable Poisson ratios, and multiple discrete dimensional configurations. Further, combination structures of multiple individual non-shearing axial auxetic structures having useful functions and properties are also disclosed.

One exemplary embodiment of the invention comprises a non-shearing axial auxetic structure including a spheroid surface having a pattern of repeating unit cells, each unit cell formed by four elements in a closed shape, each of the plurality of elements having two ends, where each of the two ends of each of the plurality of elements is coupled to one or more adjacent elements by a pivot joint, where a first pivot joint between two of the four elements couples to at least one first adjacent cell. The pattern of repeating unit cells has a contracted configuration and an expanded configuration. Each unit cell can be further defined by an internal angle between two of the plurality of elements. In addition, the elements forming the closed shape for each of the unit cells can be more compliant radially than along the spheroid surface. In some embodiments, the spheroid surface can comprise polar pivot joints at opposing poles of the spheroid surface.

In further embodiments, a second pivot joint between the remaining two of the four elements can couple to at least one second adjacent cell opposite the first adjacent cell. In some cases, the closed shape can comprise a rhomboid such that the remaining two of the four elements with the second pivot joint between form an interior angle less than 180 degrees. In some cases, the closed shape can comprise an arrowhead such that the remaining two of the four elements with the second pivot joint between form an interior angle greater than 180 degrees. The second pivot joint can move toward an interior of the closed shape in the contracted configuration and move toward making the second pivot joint collinear with a third pivot join and a fourth pivot joint of the closed shape in the expanded configuration.

In further embodiments, the spheroid surface can comprise an n* orbifold and the pattern of repeating unit cells can comprise unit cells each formed of the four elements form a closed equatorial ring around the spheroid surface. Equatorial twisting relative to poles of the spheroid surface can induce switching of a Poission's ratio of the non-shearing auxetic axial structure.

In further embodiments, the spheroid surface can comprise an 2*n orbifold and the pattern of repeating unit cells can comprise unit cells each formed of the four elements where the first pivot joint of each unit cell is disposed at a pole of the spheroid surface and the second pivot joint between the remaining two of the four elements moves toward an equator of the spheroid surface in the expanded configuration. The non-shearing auxetic axial structure can comprise a universal joint across poles of the spheroid surface. In some cases, a second non-shearing auxetic axial structure can be disposed within the non-shearing auxetic axial structure to form a pair of nested universal joints across poles of each spheroid surface. In addition, one or more additional non-shearing auxetic axial structure can be coupled pole to pole to the non-shearing auxetic axial structure to form a universal joint across serially connected poles of each spheroid surface.

In still further embodiments, the spheroid surface can comprise an *22n orbifold and the first pivot joint for each of at least some of the unit cells can be disposed at a second pole of the spheroid surface, the second pole of the spheroid surface opposite the first pole, where a common number of units cells have the first joint disposed at the first pole as have the first joint at the second pole and the second joint of each of such unit cells are coupled to pairs of elements which coupled in turn to matching pairs of elements from opposing unit cells.

In yet further embodiments, the first pivot joint for each of the unit cells can be disposed at a first pole of the spheroid surface. In this case, the spheroid surface can comprise an *nn orbifold and a second pivot joint between a remaining two of the four elements for each of the unit cells having the first pivot joint disposed at the first pole of the spheroid surface can be coupled to a first end of a longitudinal element where a second end of the longitudinal element is disposed at a common pivot joint disposed at a second pole of the spheroid surface opposite the first pole.

Another exemplary embodiment of the invention comprises a non-shearing axial auxetic structure including a spheroid surface having a pattern of repeating unit cells, each unit cell defined by a plurality of elements in a closed shape, each of the plurality of elements having two ends, where each of the two ends of the plurality of elements is coupled to one or more adjacent elements by a pivot joint, where the pattern of repeating unit cells has a contracted configuration and an expanded configuration. The non-shearing axial auxetic structure further comprises a pair of opposing crown elements each having a common number of extensions from a central hub, each of the pair of opposing crown elements having the central hub disposed at opposite poles of the spheroid surface such that ends of the extensions interlace and the end of each extension comprises an extension pivot joint coupled to adjacent extension links between both adjacent extensions of the opposing crown element.

In further embodiments, the spheroid surface can comprise an nx orbifold and the pattern of repeating unit cells can comprise unit cells each formed of four elements in the closed shape where a first pivot joint is coupled between two of the four elements and a second pivot joint comprises the extension pivot joint such that a remaining two of the four elements is formed from a portion of the adjacent extension links and the two of the four elements have ends each coupled to a third and a fourth at a midpoint of the adjacent extension links. The non-shearing auxetic axial structure can comprise a universal joint across poles of the spheroid surface.

Yet another exemplary embodiment of the invention comprises a non-shearing axial auxetic structure including a spheroid surface having a pattern of repeating unit cells, each unit cell formed by four elements in a closed shape, each of the plurality of elements having two ends, where each of the two ends of each of the plurality of elements is coupled to one or more adjacent elements by a pivot joint, where a first pivot joint between two of the four elements couples to at least one first adjacent cell and a second pivot joint between the remaining two of the four elements couples to at least one second adjacent cell opposite the first adjacent cell. The pattern of repeating unit cells has a contracted configuration and an expanded configuration and the pattern of repeating unit cells comprises unit cells each formed of the four elements where the first pivot joint of each unit cell is disposed at a pole of the spheroid surface and the second pivot joint between the remaining two of the four elements moves toward an equator of the spheroid surface in the expanded configuration and the non-shearing auxetic axial structure comprises a universal joint across poles of the spheroid surface.

BRIEF DESCRIPTION OF THE DRAWINGS

FIG. 1A shows a prior art axial auxetic structure of Schonflies $C_n$ (Orbifold nn) schematically illustrating induced expansion as well as an example embodiment;

FIG. 1B shows prior art axial auxetic structure of Schonflies $D_n$ (Orbifold 22n) schematically illustrating induced expansion as well as an example embodiment;

FIGS. 2A and 2B show an axial auxetic structure of Schonflies $C_{nh}$ (Orbifold n*) schematically illustrating induced expansion and an example embodiment, respectively;

FIGS. 5A and 5B show an axial auxetic structure of Schonflies $D_{nd}$ (Orbifold 2*n) schematically illustrating induced expansion and an example embodiment, respectively;

FIGS. 6A and 6B show an axial auxetic structure of Schonflies $S_{2n}$ (Orbifold Nx) schematically illustrating induced expansion and an example embodiment, respectively;

DETAILED DESCRIPTION

1.0 Non-Shearing Axial Auxetic Structures

Figure 2C:
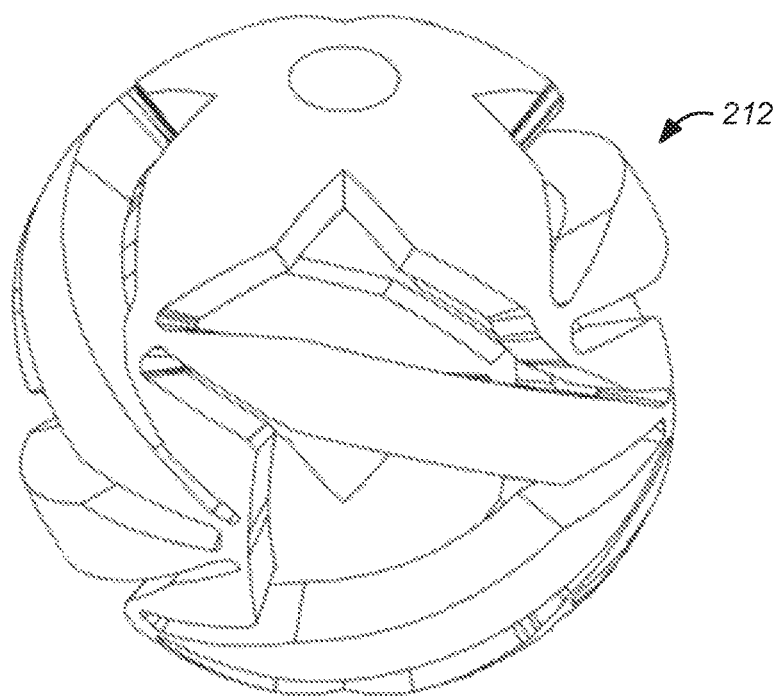
FIGS. 2C to 2E show, perspective, back and front views, respectively, of an exemplary axial auxetic structure of Schonflies $C_{nh}$ (Orbifold n*)

In the following description including the preferred embodiment, reference is made to the accompanying drawings, which form a part hereof, and in which is shown by way of illustration a specific embodiment in which the invention may be practiced. It is to be understood that other embodiments may be utilized and structural changes may be made without departing from the scope of the present invention.

Example devices, methods, and systems are described herein. It should be understood the words "example," "exemplary," and "illustrative" are used herein to mean "serving as an example, instance, or illustration." Any embodiment or feature described herein as being an "example," being "exemplary," or being "illustrative" is not necessarily to be construed as preferred or advantageous over other embodiments or features. The example embodiments described herein are not meant to be limiting. It will be readily understood aspects of the present disclosure, as generally described herein, and illustrated in the figures, can be arranged, substituted, combined, separated, and designed in a wide variety of different configurations, all of which are explicitly contemplated herein.

Furthermore, the particular arrangements shown in the Figures should not be viewed as limiting. It should be understood other embodiments may include more or less of each element shown in a given Figure. Further, some of the illustrated elements may be combined or omitted. Yet further, an example embodiment may include elements not illustrated in the Figures. As used herein, with respect to measurements, "about," "approximately," or "substantially" means +/−5%.

Auxetic structures are materials/devices which expand planarly or volumetrically under positive strain. These are widely used in stents, deployable structures, and now robotics. A novel family of auxetics are disclosed herein which are based on axial point group symmetries. Prior art auxetic structures have been planar, cylindrical, or based on the symmetries of the polyhedral. U.S. Patent Application Publication No. 2018/0311833, which is incorporated by reference herein, and for which the present inventor is a co-inventor, discloses the first axial point group auxetics. Disclosed herein are additional point group auxetics unlike any previously disclosed sets of patterns. These novel structures afford a range of unique and useful properties including behaving as compliant universal joints, structures having switchable Poisson's ratios, and using an input force to toggle between two discrete formations with differences in dimension as described hereafter.

FIG. 1A shows a prior art axial auxetic structure of Schonflies $C_n$ and Orbifold nn schematically illustrating induced expansion as well as an example embodiment. FIG. 1B shows prior art axial auxetic structure of Schonflies $D_n$, and Orbifold 22n schematically illustrating induced expansion as well as an example embodiment. Both these auxetic structures were previously defined in the U.S. Patent Application Publication No. 2018/0311833A1 referenced above. The other structures disclosed herein present novel auxetic patterns and structures.

The universal joint is a mechanism which is ubiquitous in everyday life, particularly in vehicle propulsion systems. Universal joints convert rotation along one axis into rotation along another. Previous universal joints have either been made of flexures as a compliant mechanism, or as discrete components. Both styles are not fully complaint, many flexure-based universal joints are rigid in most directions and only use their compliance at a joint. Both flexure-based and traditional universal joints have difficulty with being easily nested inside of each other. This lack of nesting prevents such prior art universal joints from being used as a concentric drive mechanism. A truly compliant universal joint auxetic has superior potential for use as a soft robotic component or in medical devices resulting from its ability to be nested and to be pliant for human contact or insertion through tight spaces. The auxetic universal joint structure's compliance refers to its ability to retain its function as a universal joint after being in a compressed or constrained form, such as for passage through a catheter lumen. In general, these structures undergo recoverable deformations under external loading, whether along the desired load path or along other directions. In addition, auxetics structures exhibiting switchable Poisson ratio open a new design space for engineers.

Embodiments of the structures disclosed herein can be made with conventional manufacturing processes such as laser cutting, casting, stamping and injection molding and 3D printing. They can be produced as structures which are made from a base component and assembled, or they can be made from continuous material where the joints are produced as living hinges or flexures. The example structures illustrated in the figures herein can be produced from 10 thousandths thick spring steel which is either waterjet or lasercut or any other known suitable cutting process. The joints can be made from either screws and nuts or from rivets or any other known suitable pinned joint.

Embodiments of the individual auxetic structures described hereafter can be combined, connected, joined, coupled etc. to create a linear, planar, and/or spatial structure which may then have some properties as a larger structure that the individual auxetic also possesses. For example, embodiments using a continuous material approach are highly applicable in 3D printing and laser cutting processes. Using 3D printing processes multiple auxetic structures can be tiled to fill a part and provide it with unique properties. For instance, a computer program can take a geometry and tile it with one or more of these auxetic structures. If a switchable Poisson's ratio structure is used, the object resulting from the tiling and printing could have a switchable Poisson's ratio, either planarly, or spatially. In another example, if torque is being transmitted axially or linearly, multiple auxetic structures which function as universal joints can be attached—the pole of one to the pole of another—to allow additional flexure for the line of torque transmission.

The axial auxetic structures disclosed herein typically rely on beams (links or elements) with significantly more stiffness in the directions along the surface of the sphere than in the radial direction. This directional stiffness can be achieved by aspect ratio, fiber alignment, or anisotropic material properties. This allows the beams to bend and change curvature, or stated differently, it selectively increases the structure's compliance along certain directions. This compliance of elements in directions normal to the surface of the defined spheroid and stiffness in the plane of the defined surface of the spheroid assists the transition between larger and smaller sizes while maintaining a spheroid definition.

Those skilled in the art will appreciate that the embodiments of the invention are directed to a range of novel non-shearing axial auxetic structures. The structures are defined as a unit comprising a spheroid surface made up of a plurality of cells covering the unit. The spheroid surface is imaginary and imperfect comprising the spaces between elements or links interconnected to form a plurality of closed shapes in a pattern of repeating unit cells. Each unit cell is defined by a plurality of elements in a closed shape. Each of the plurality of elements has two ends each coupled to one or more adjacent elements by a pivot joint. The pivot joint can be coupled to either another one of the plurality of elements of the unit cell or that of an adjacent unit cell. In some cases, adjacent elements can be coupled to a midpoint of an element. The pattern of repeating unit cells on the spheroid surface has a contracted configuration and an expanded configuration.

A four sided closed shape is particularly important in many of the structures described hereafter. The closed shape is formed from four elements where a first pivot joint couples between two of the four elements and a second pivot joint couples between the remaining two elements. The outer ends of the first two elements and the remaining two elements are then joined by two additional pivot joints to form the four sided closed shape. Transformation of this shape as part of the pattern of repeating unit cells on the spheroid surface is critical to contraction and expansion of the structure as well as accompanying transformation of properties, e.g. from auxetic to non-auxetic modes. Transformation of this closed shape can be described as a change between a rhomboid (or kite shape) and an arrowhead which can be isolated to a change in the angle between two adjacent elements joined together by a pivot joint. The closed shape comprises a rhomboid when the two elements with the pivot joint between form an interior angle of the closed shape less than 180 degrees and the closed shape comprises an arrowhead when the two elements with the pivot joint between form an interior angle of the closed shape greater than 180 degrees. As the angle between the two elements is changed an inflection between the rhomboid and arrowhead occurs when the two elements are collinear (i.e. the angle between is 180 degrees) at which point the closed shape is triangular.

Coupling of the structure units to other units, ground or other structures is typically made at poles of the spheroid surface which are defined by elements or links extending to these locations. Those skilled in the art will appreciate structural definition and manipulation of the defined novel non-shearing axial auxetic structures may be made with reference to equatorial, latitudinal, longitudinal and/or polar references applied to spheroid surface defined on the structure. Further embodiments of the invention comprise a combination of individual units of the non-shearing axial auxetic structures having defined spheroid surfaces.

2.0 Schonflies $C_{nh}$ (Orbifold n*) Axial Auxetic Structures

FIGS. 2A and 2B show an axial auxetic structure of Schonflies $C_{nh}$ Orbifold n*) schematically illustrating induced expansion and an example embodiment, respectively. The auxetic structure 200 of FIG. 2A comprises a pattern of collapsible arrowhead shapes 204 tiled around the equator of the spheroid shape 202. The adjacent arrowhead shapes 204 are coupled midpoint of the arrowhead tail (between the adjacent elements 206C, 206D of the arrowhead tail) to point of the adjacent arrowhead shape (where lead elements 206A, 206B join). The spheroid shape 200 is completed with the addition of longitudinal elements 208A, 208B each extending from the ends of arrowhead tail elements 206C, 206D to be joined together at respective opposing poles of the spheroid shape 200, each arrowhead shape provides one longitudinal element 208A, 208B to be connected to the upper and lower pole 210A, 210B. Shape of the structure 200 can be defined by a selected angle between one of the tail elements 206D and the adjacent lead element 206A. Typically, the tail elements 206C, 206D have matching lengths and the lead elements 206A, 206B also have matching lengths. However, the tail elements 206C, 206D are shorter than the lead elements 206A, 206E in order to facilitate the transitioning to a non-auxetic mode via twist about the equator relative to the poles described hereafter. Note that equatorial force for the twist is applied between the tail elements 206C, 206D away from the tip of the arrowhead shape to transition from auxetic to non-auxetic. The arrowhead shape can be constructed with the tip pointing in either direction around the equator of the spheroid shape.

As it can be observed that each arrowhead shape is defined by four elements 206A, 206B, 206C, 206D to form the closed shape of the arrowhead 204 which is collapsible between two adjacent elements 206C, 206D of the arrowhead tail. Similarly, each arrowhead shape 204 grows (between the dimension between the tip and the joint between the two adjacent elements 206C, 206D of the tail) as the two adjacent elements 2060, 206D of the arrowhead tail become collinear. This growth occurs as a direct result of tension applied across the poles of the spheroid shape 202 which draws directly on longitudinal elements 208A, 208B coupled to the two adjacent elements 206C, 206D to make them collinear, thereby driving the connection between axial (polar) extension and equatorial expansion, i.e. a negative Poisson's ratio.

It should also be noted that the defined auxetic structure 200 enters a non-auxetic regime when the adjacent links 206C, 206D of the arrowhead tail go beyond a collinear position to form a kite shape rather than an arrowhead 204 shape. This behavior is further described hereafter regarding FIGS. 2F-2H and 8A-8C. It should be noted that although the example embodiments may be shown using a particular number of closed shape filings (in this case, four arrowhead shapes making those skilled in the art will appreciate any of the described embodiments of the invention herein can be implemented using any number of closed shape tilings.

Figure 2D:
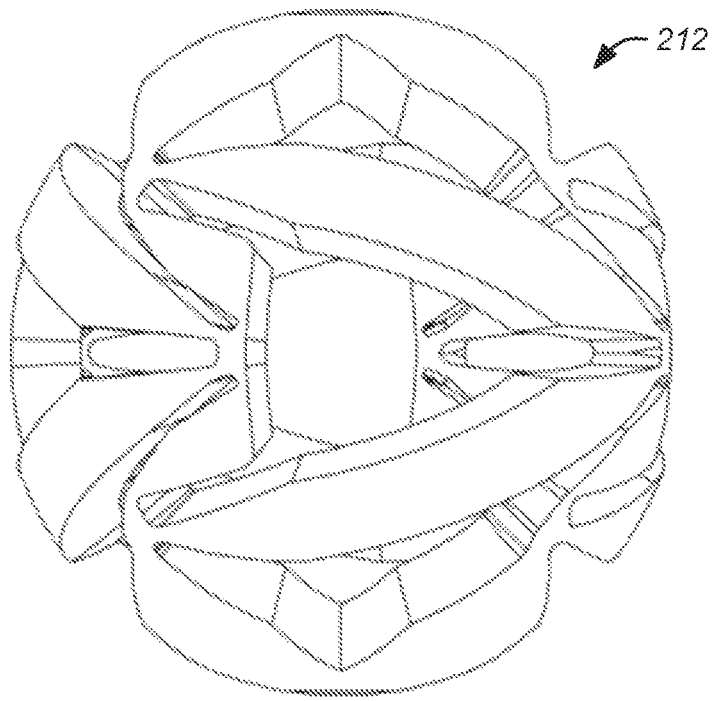
Figure 2E:
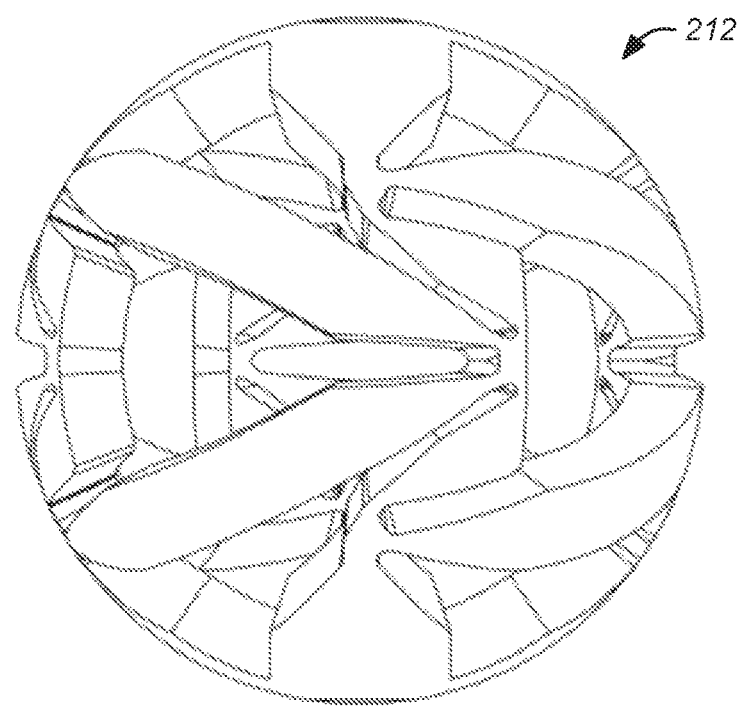

FIGS. 2C to 2E show, perspective, back and front views, respectively, of an exemplary axial auxetic structure 212 of Schonflies $C_{nh}$ (Orbifold n*). This example structure 212 of FIG. 2B is a unitary structure as can be produced using 3D printing. Joints between elements are formed having hinge lines normal to the plane of the spheroid surface.

Figures 2F, 2G:
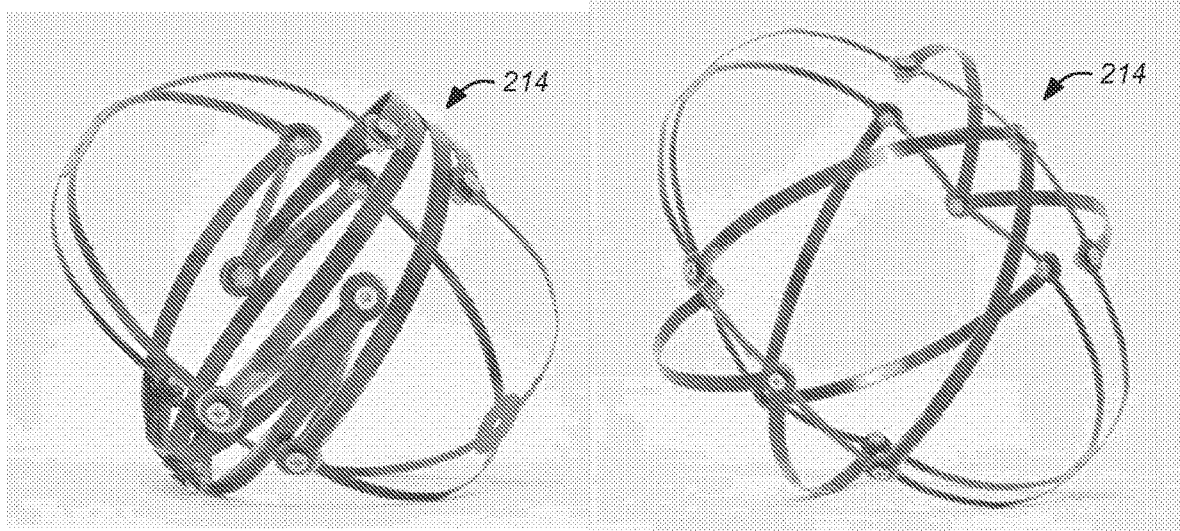
FIGS. 2F-2H show an exemplary Schonflies $C_{4h}$ (Orbifold 4*) auxetic expanding and then transitioning to a non-auxetic region by a twist around the structure equator.
Figure 2H:
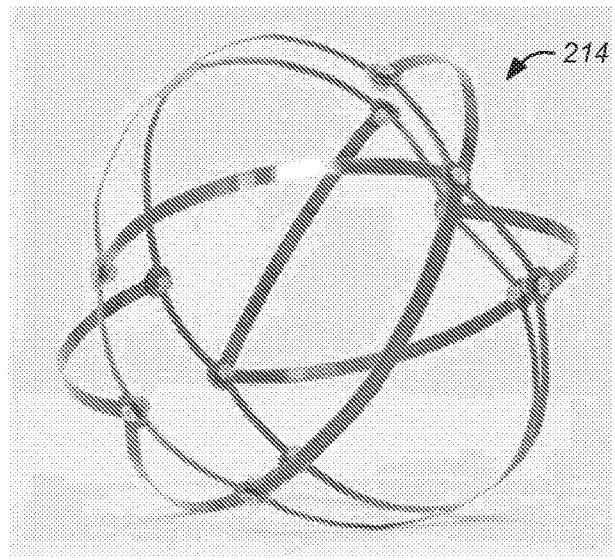

FIGS. 2F-2H show an exemplary Schonflies $C_{4h}$ (Orbifold 4*) auxetic structure 214 expanding and then transitioning to a non-auxetic region by a twist around the structure equator. FIG. 2F shows the example structure 214 fully contracted with the arrowhead shapes collapsed. FIG. 2G shows the structure 214 expanded with the tail elements nearly collinear. FIG. 2H shows the structure 214 now transitioned to non-auxetic as the tail elements are past a collinear position with one another such that the tiled shapes are now rhomboid (kite shaped). Transition to this mode can be achieved by fixing the poles of the spheroid shape and applying a moment around the equator, particularly where the tail elements are joined to one another, in a direction opposite that of the collapsing tail in the auxetic mode. Once the structure 214 has been transitioned to the non-auxetic mode tension applied across the poles of the structure will now cause the equator of the structure 214 to shrink, i.e. exhibiting a positive Poisson's ratio.

3.0 Schonflies $D_{nh}$ (Orbifold *22n) Axial Auxetic Structures

Figure 3A:
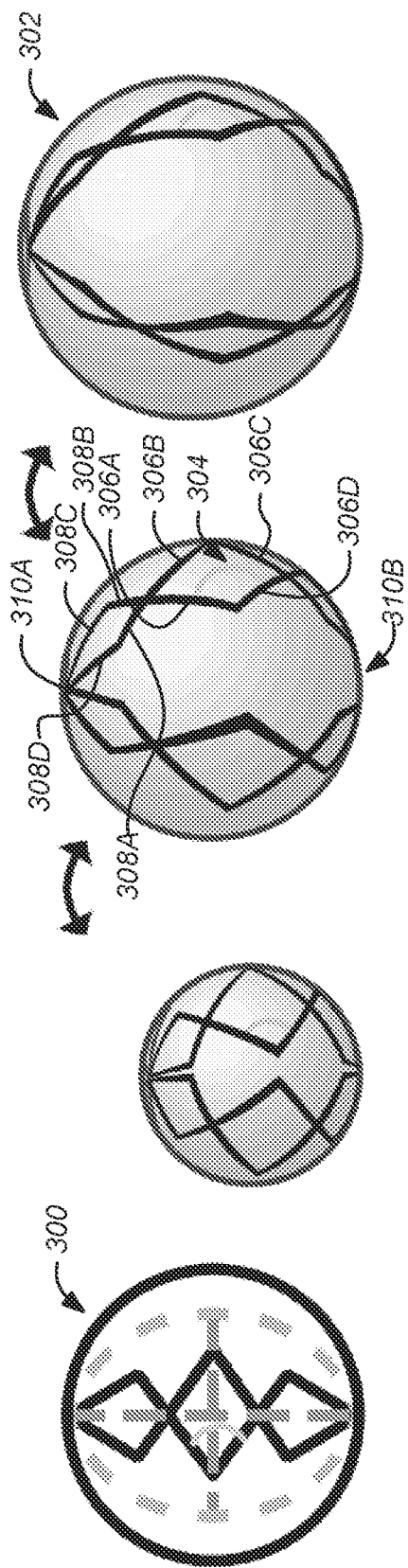
FIGS. 3A and 3B show an axial auxetic structure of Schonflies $D_{nh}$ (Orbifold *22n) schematically illustrating induced expansion and an example embodiment, respectively.
Figure 3B:
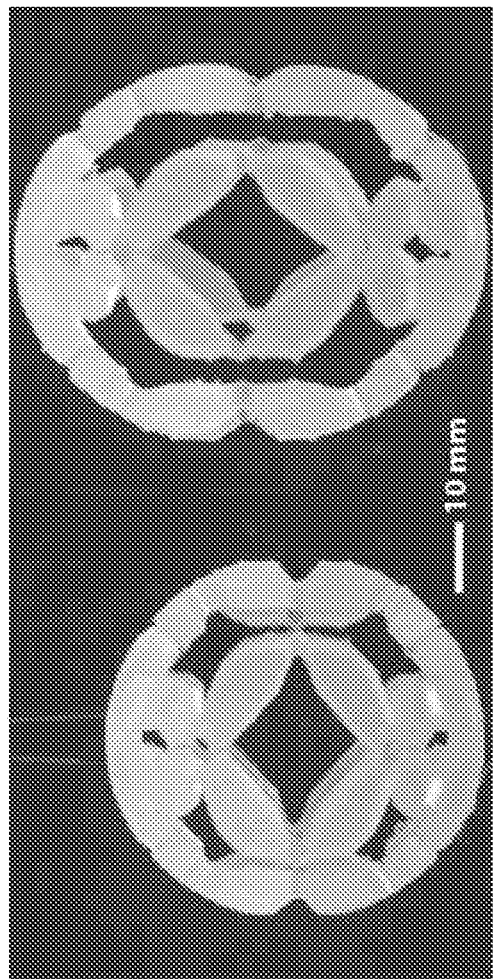
Figure 3C:
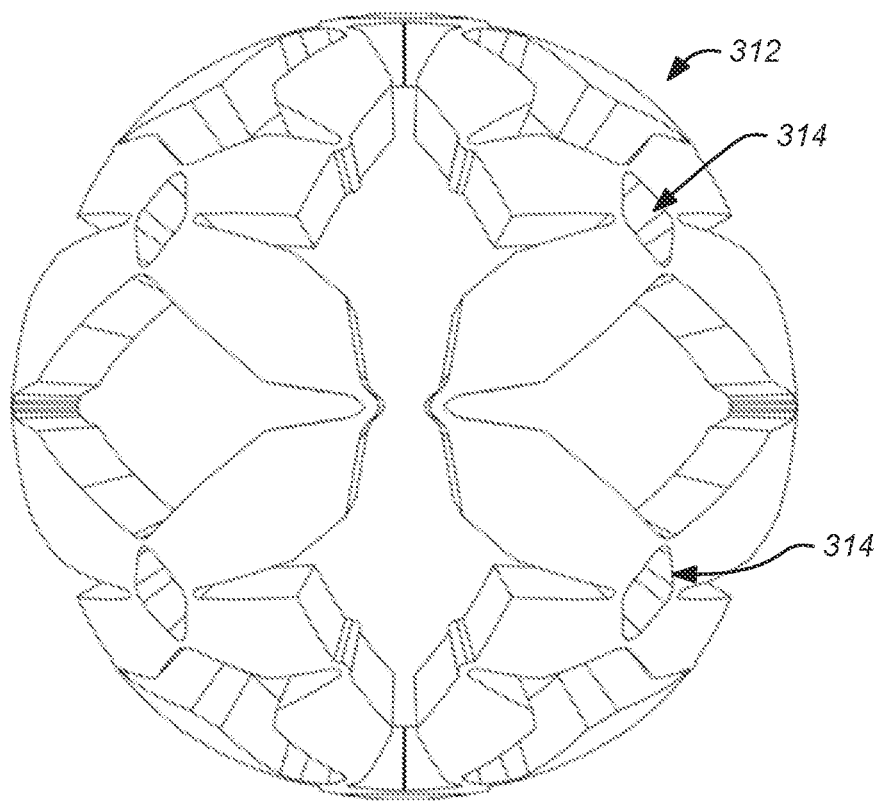
FIGS. 3C to 3F side, front, front perspective, and angled perspective views, respectively, of an exemplary axial auxetic structure of Schonflies $D_{nh}$ (Orbifold *22n)
Figure 3D:
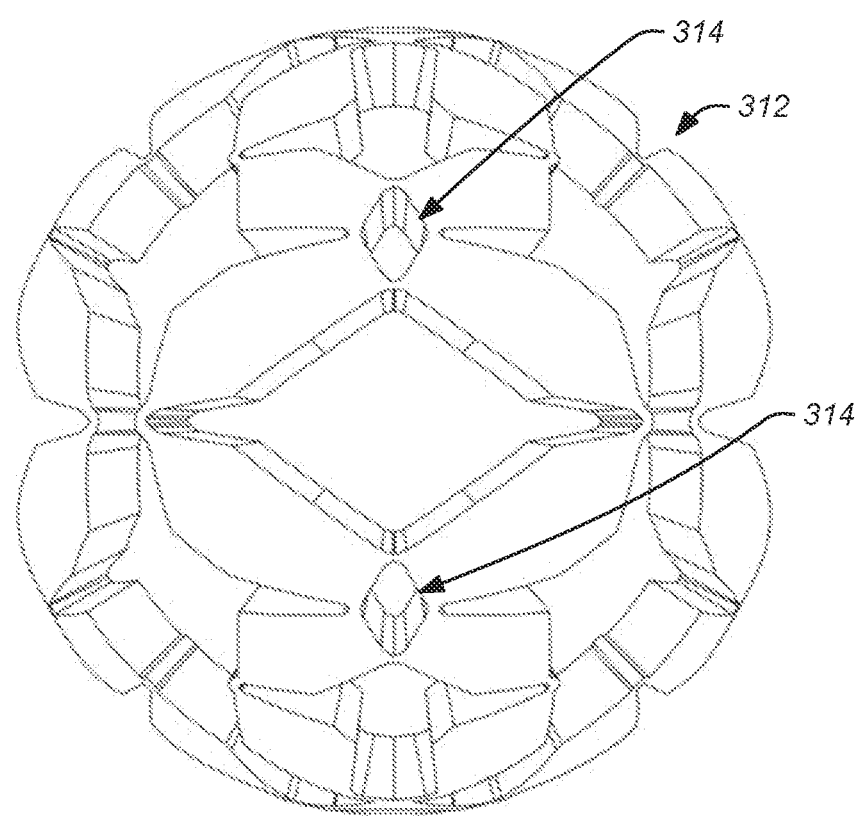
Figure 3E:
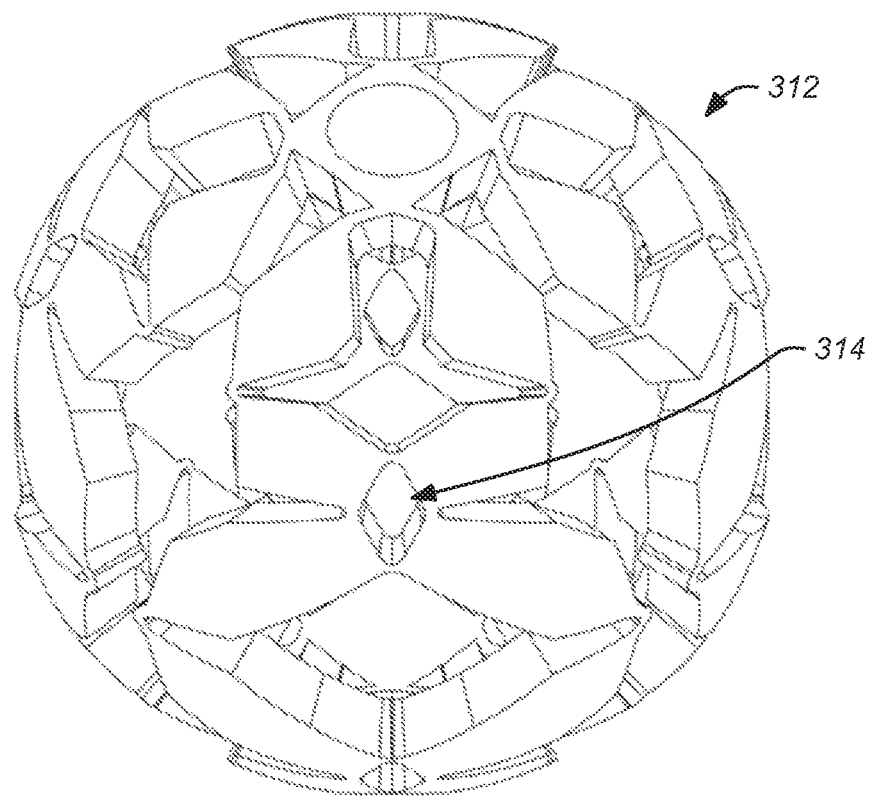
Figure 3F:
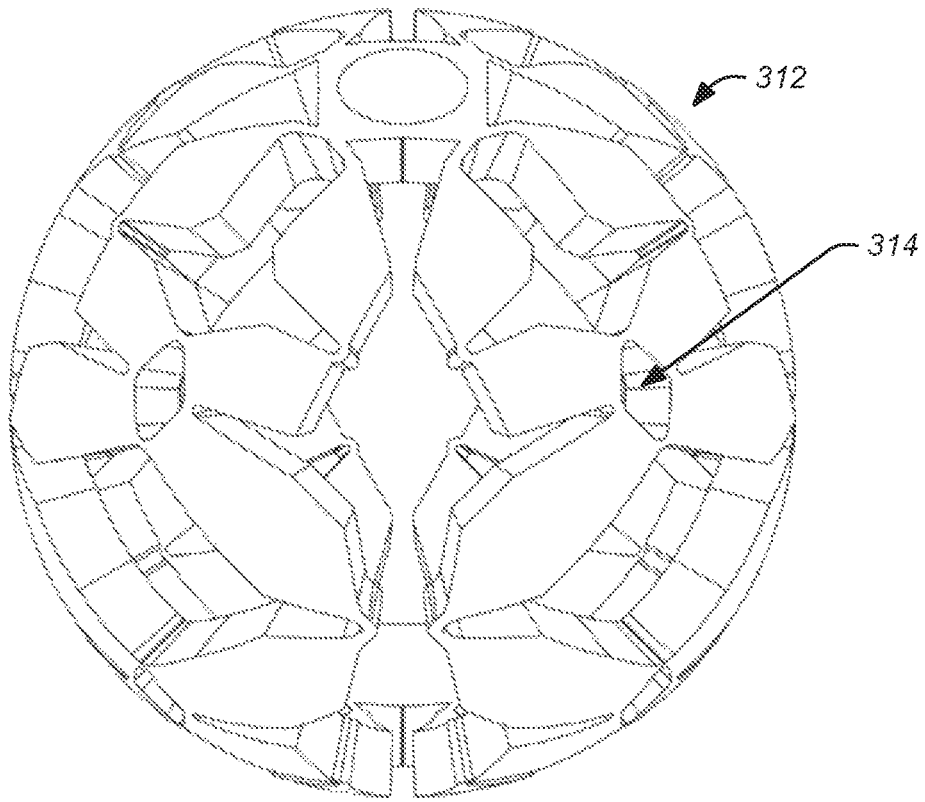

FIGS. 3A and 3B show an axial auxetic structure 300 of Schonflies (Orbifold *22n) schematically illustrating induced expansion and an example embodiment, respectively. The auxetic structure 300 of FIG. 3A comprises a pattern of collapsible closed rhomboid shapes 304 each tiled longitudinally (pole to pole) around the spheroid shape 302. Each rhomboid shape 304 is formed from four elements 306A, 306B, 306C, 306D). Significantly, at least one joint of one of the rhomboid shapes 304 on each longitudinal line comprises elements 306A, 306B which are coupled to elements 308B, 308A of the adjacent rhomboid shape of the same longitudinal line. Coupling can be accomplished most easily by forming a shared elements joined at their midpoints resulting in a scissor joint. For example, element 306A and element 308B comprise a shared element and element 306B and element 308A comprise a shared element. The shared elements 306A, 308B, 306B, 308A are then joined together in the middle. Alternately, the joint between the elements 306A, 308B, 306B, 308A can comprise a form which causes closing between the elements 306A, 306B of the rhomboid shape 304 to drive closing between elements 308A, 308b of the adjacent rhomboid shape. Shape of the structure 300 can be defined by a selected angle between one of the element 306B and element 306A of the rhomboid shape 304.

The structure 300 can be formed using any number of adjacent rhomboid shapes linked together as described on each longitudinal line. Each rhomboid shape at either end of its respective longitudinal line has end elements 308C, 308D which are joined together with all the other end elements of the remaining longitudinal lines at each pole 310A, 310B of the spheroid shape 302. As the tension is applied across the poles 310A, 310B, the longitudinal lines elongate while maintaining a curve in the plane of the spheroid surface. Accordingly, the equator of the spheroid shape 302 enlarges as the longitudinal lines elongate consistent with a negative Poisson's ratio.

FIGS. 3C to 3F side, front, front perspective, and angled perspective views, respectively, of an exemplary axial auxetic structure 312 of Schonflies $D_{nh}$ (Orbifold *22n). This example structure 312 of FIG. 3B is a unitary structure as can be produced using 3D printing. Joints between elements are formed having hinge lines normal to the plane of the spheroid surface. The linking joint 314 between adjacent rhomboid shapes is formed from a small rhomboid of adjacent hinge parallel hinge lines. This linking joint 314 causes two adjacent elements forced together to drive the remaining elements together in response.

4.0 Schonflies $C_{nv}$ (Orbifold *nn) Axial Auxetic Structures

Figure 4A:
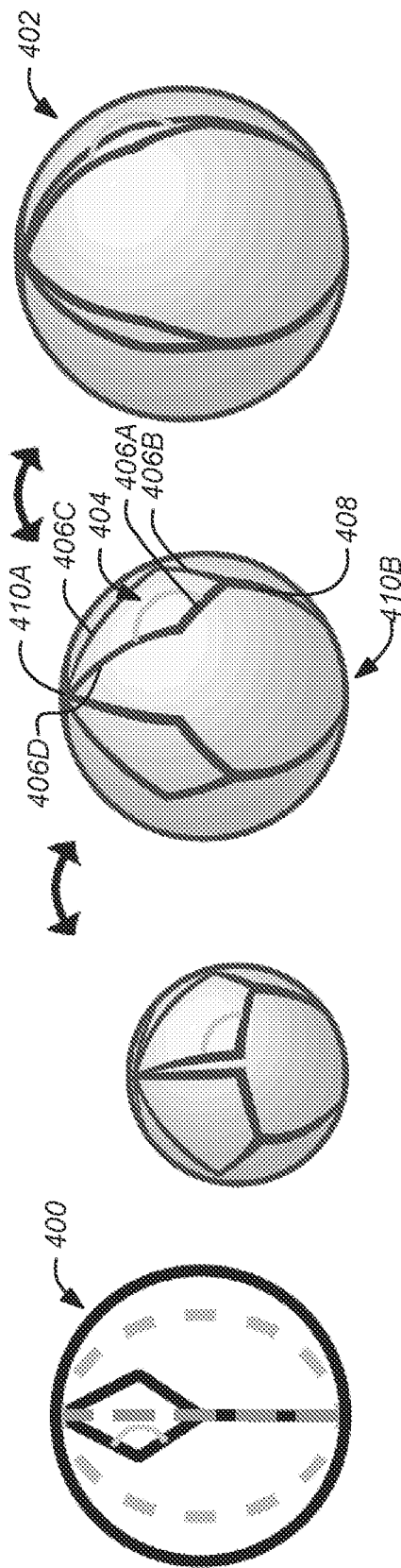
FIGS. 4A and 4B show an axial auxetic structure of Schonflies $C_{nv}$ (Orbifold *nn) schematically illustrating induced expansion and an example embodiment, respectively.
Figure 4B:
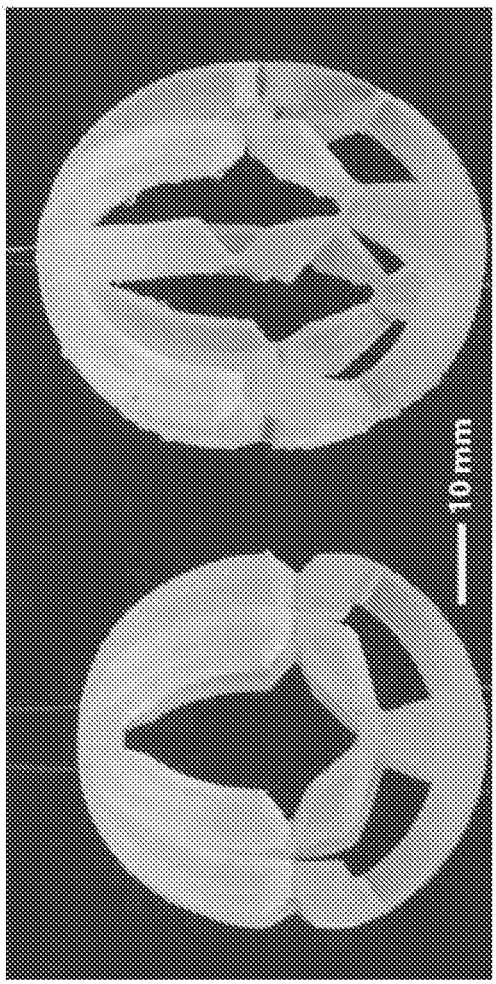
Figure 4C:
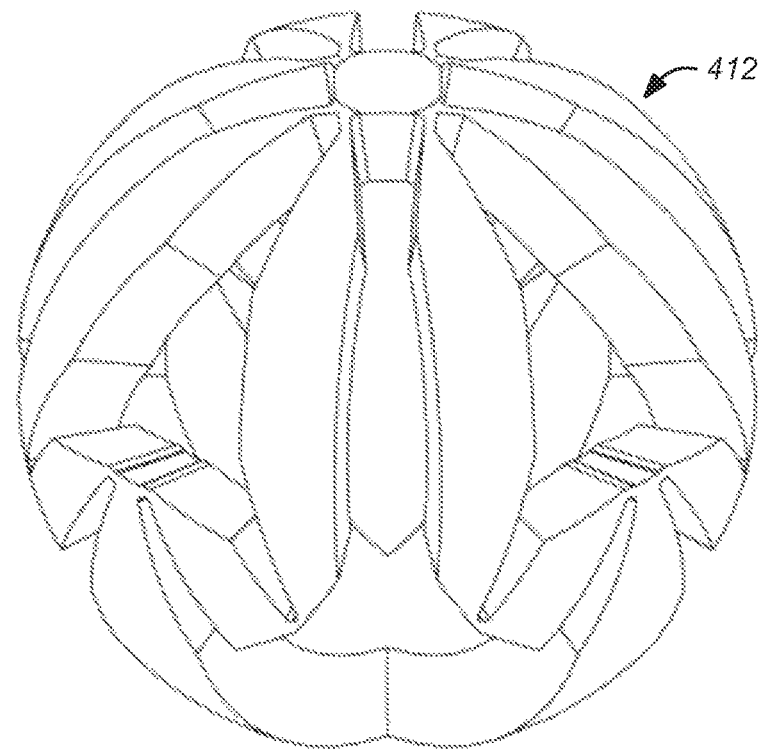
FIGS. 4C to 4F perspective, side, front, and lower perspective views, respectively, of an exemplary axial auxetic structure of Schonflies $C_{nv}$ (Orbifold *nn)
Figure 4D:
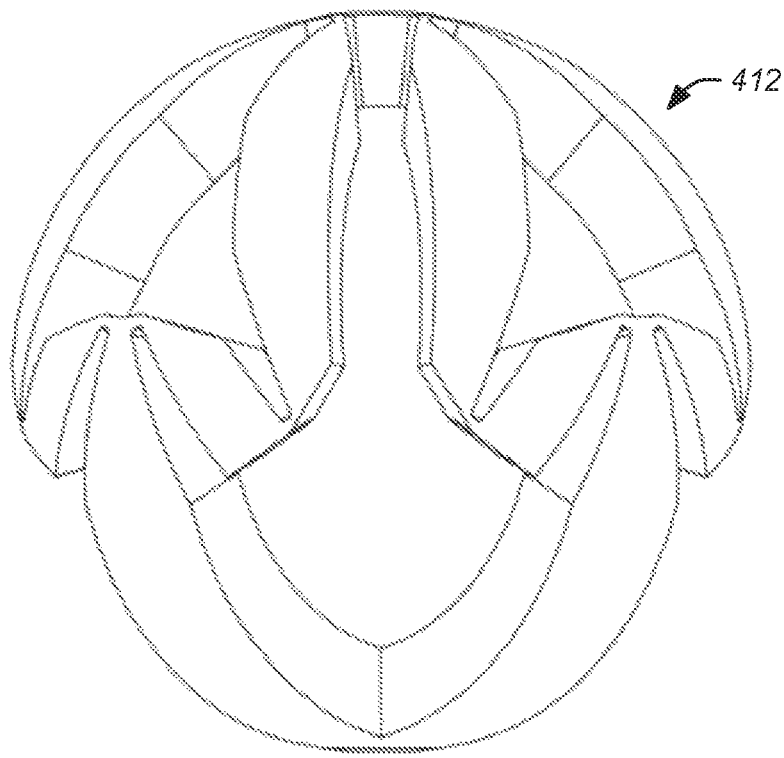
Figure 4E:
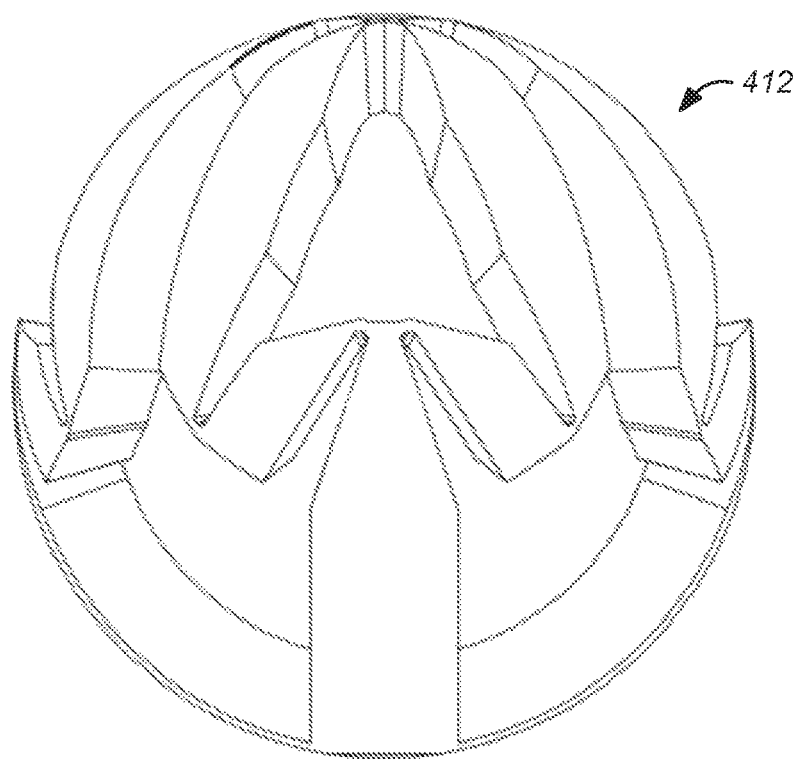
Figure 4F:
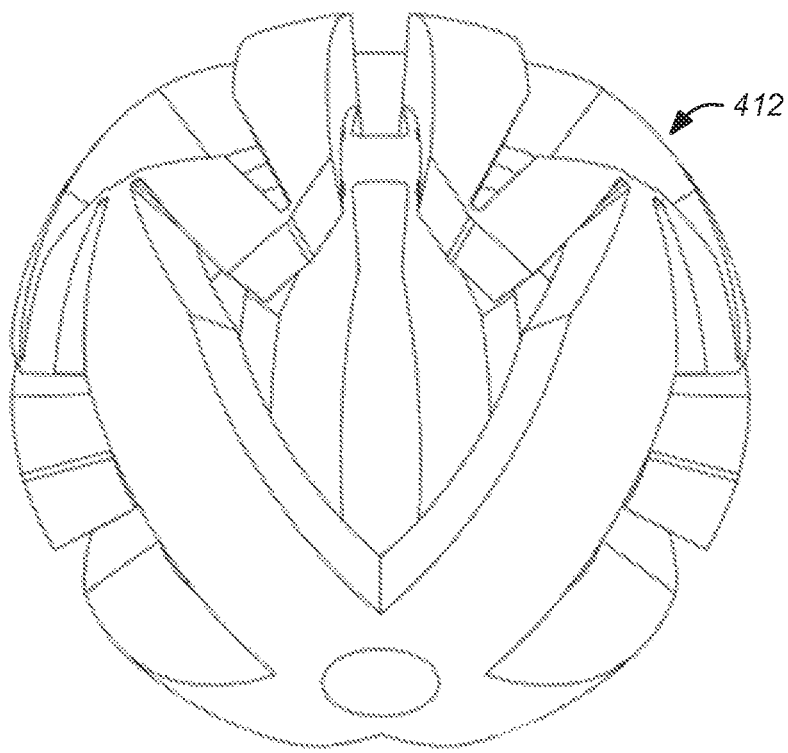

FIGS. 4A and 4B show an axial auxetic structure of Schonflies $C_{nv}$ (Orbifold *nn) schematically illustrating induced expansion and an example embodiment, respectively. The auxetic structure 400 of FIG. 4A comprises a pattern of collapsible rhomboid shapes 404 each tiled longitudinally (pole to pole) around the spheroid shape 402. This structure 400 can be envisioned as a truncation of the structure 400 described above. In this case; each rhomboid shape 404 is formed from four elements 406A, 406B, 406C, 406D. However, this structure 400 requires no coupled joints as the structure 300 does. In this structure, each longitudinal line comprises a single rhomboid shape 404 having ends of two elements 406C, 406D joined altogether at a common pole 410A of the spheroid shape 402. The remaining two elements 406A, 406B of the closed rhomboid shape 404 have ends joined together with one end of a longitudinal element 408. Each longitudinal element 408 of each longitudinal line has its opposite end joined together with all the other opposite ends of the remaining longitudinal elements at the opposing pole 410B of the spheroid shape 402. Shape of the structure 400 can be defined by a selected angle between one of the element 406D and element 406A of the rhomboid shape 404.

The structure 400 can be formed using any number of adjacent rhomboid shapes linked together as described on each longitudinal line. As the tension is applied across the poles 410A, 410B, the longitudinal lines elongate while maintaining a curve in the plane of the spheroid surface. Accordingly, the equator of the spheroid shape 402 enlarges as the longitudinal lines elongate consistent with a negative Poisson's ratio.

FIGS. 4C to 4F perspective, side, front, and lower perspective views, respectively, of an exemplary axial auxetic structure of Schonflies $C_{nv}$ (Orbifold *nn). This example structure 412 of FIG. 4B is a unitary structure as can be produced using 3D printing. Joints between elements are formed having hinge lines normal to the plane of the spheroid surface.

Figure 4G:
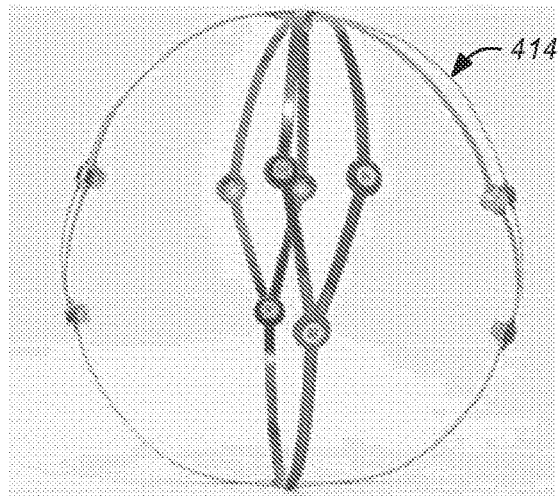
FIGS. 4G-4K show an exemplary Schonflies $C_{4v}$ (Orbifold *4.4) auxetic that can be forced into a non-auxetic region by outside force compressing the structure along its symmetry axis.
Figure 4H:
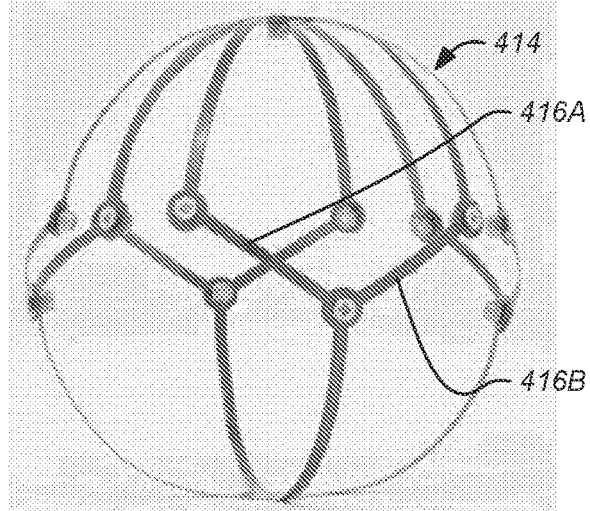
Figure 4I:
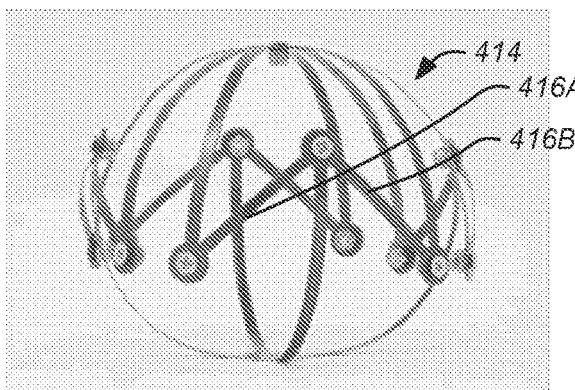
Figure 4J:
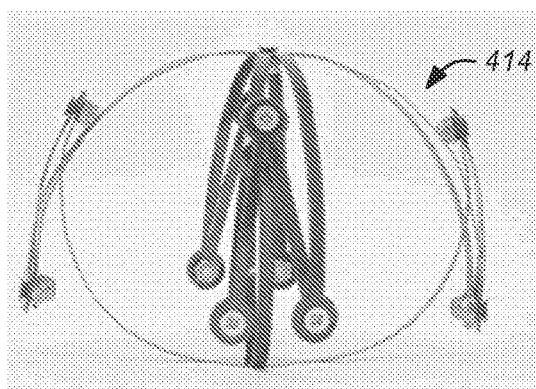
Figure 4K:
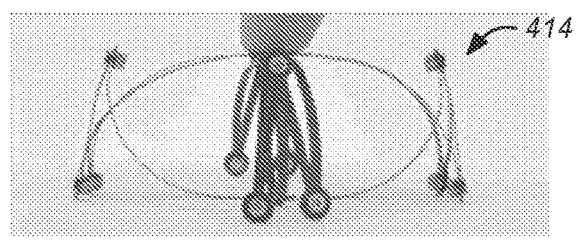

FIGS. 4G-4K show an exemplary Schonflies $C_{4v}$ (Orbifold *4·4) auxetic structure 414 that can be forced into a non-auxetic region by outside force applied across the poles compressing the structure along its symmetry axis. FIG. 4G shows the structure 414 as a fully open auxetic. FIG. 4H shows the structure 414 as a closed auxetic where the lower elements 416A, 416B of each rhomboid shape are nearly collinear. FIG. 4I shows the structure 414 now transitioning to non-auxetic mode as the lower elements 416A, 416B of each rhomboid shape are now past collinearity. FIGS. 4J and 4K show the structure nearly and fully collapsed exhibiting non-auxetic expansion between these figures as the lower elements 416A, 416B remain virtually aligned with the longitudinal lines of the spheroid surface.

5.0 Schonflies $D_{nd}$ (Orbifold 2*n) Axial Auxetic Structures

FIGS. 5A and 5B show an axial auxetic structure of Schonflies $D_{nd}$ (Orbifold 2*n) schematically illustrating induced expansion and an example embodiment, respectively. The auxetic structure 500 of FIG. 5A comprises a pattern of arrowhead shapes 504 each tiled latitudinal adjacent around each pole of the spheroid shape 502. Each arrowhead shape 504 is formed from four elements 506A, 506B, 506C, 506D. In this case, latitudinal adjacent arrowhead shapes on either side are formed using a common elements 506C, 506D of the arrowhead shape 504 and equatorial adjacent arrowhead shapes are formed using common elements 506A, 506B. Accordingly, each arrowhead shape is adjacent to four other arrowhead shapes sharing one common element with each one. The elements 506C, 506D forming the point of each arrowhead shape in each hemisphere are combined at a common joint at each pole 510A, 510B. Shape of the structure 500 can be defined by a selected angle between one of the element 506D and element 506A of the rhomboid shape 504.

The structure 500 can be formed using any number of adjacent arrowhead shapes linked together as described above. As the tension is applied across the poles 510A, 510B, the longitudinal elements 506C, 506D pull to force the tail elements 506A, 506B to become collinear enlarging the equator of the spheroid shape 502 enlarges as the longitudinal elements 506C, 506D extend axially consistent with a negative Poisson's ratio.

Figure 5C:
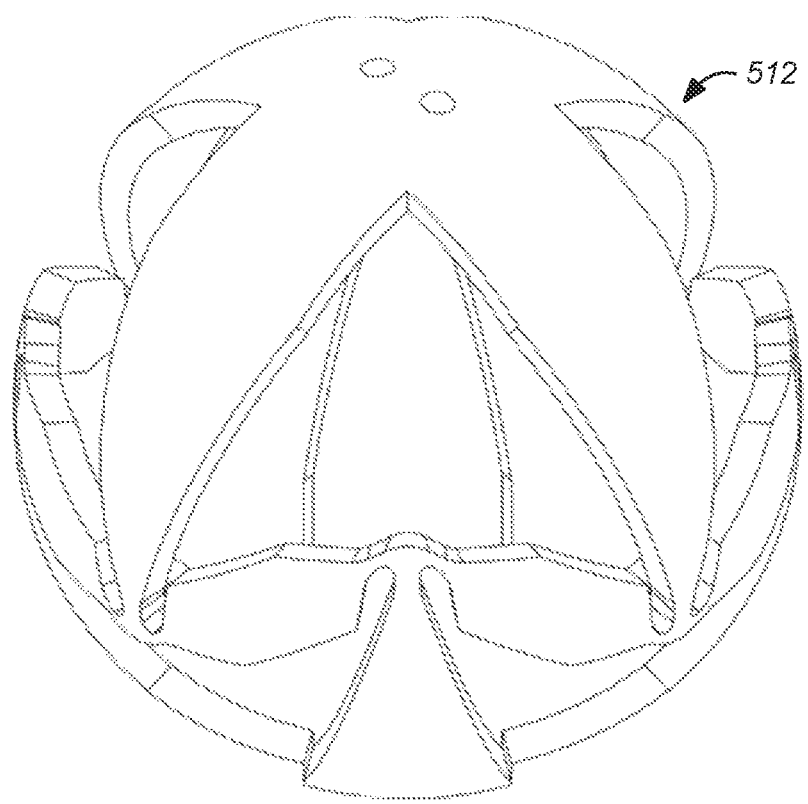
FIGS. 5C to 5E perspective, front, angled views, respectively, of an exemplary axial auxetic structure of Schonflies $D_{nd}$ (Orbifold 2*n)
Figure 5D:
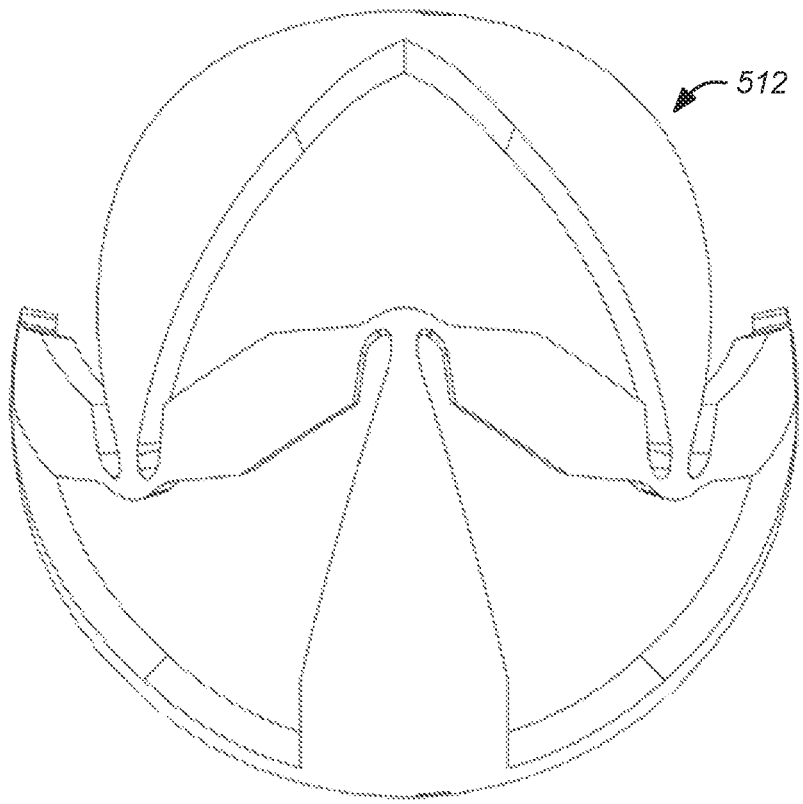
Figure 5E:
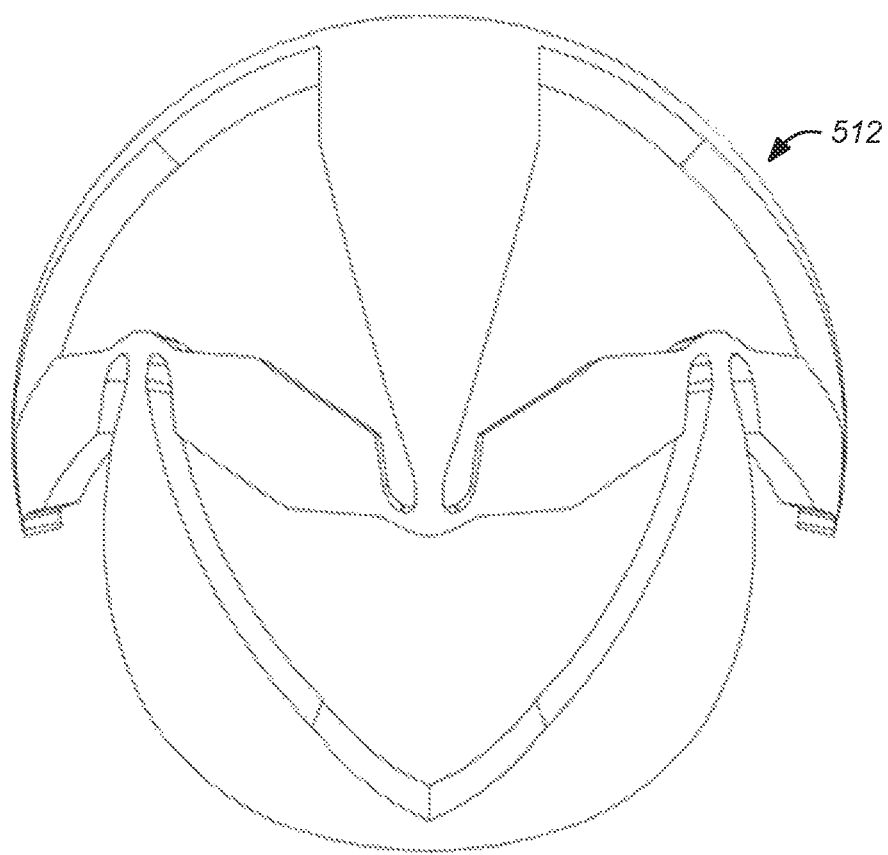

FIGS. 5C to 5E perspective, front, angled views, respectively, of an exemplary axial auxetic structure 512 of Schonflies $D_{nd}$ (Orbifold 2*n). This example structure 512 of FIG. 5B is a unitary structure as can be produced using 31) printing. Joints between elements are formed having hinge lines normal to the plane of the spheroid surface.

Figure 5F:
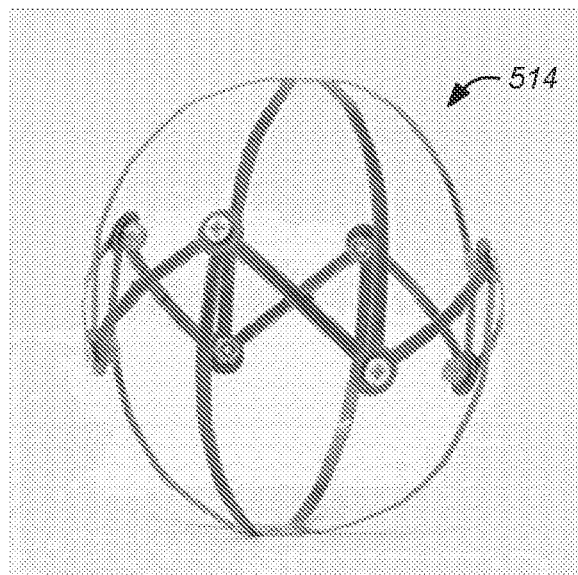
FIGS. 5F-5I show a Schonflies $D_{4d}$ (Orbifold 2*4) auxetic structure operating as a universal joint.
Figure 5G:
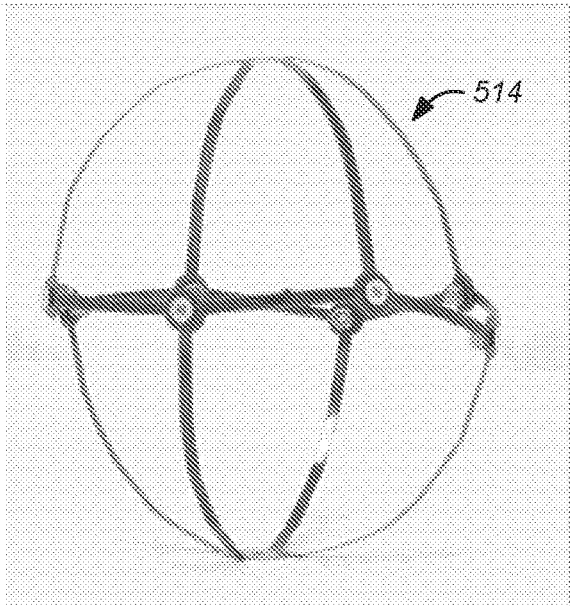
Figure 5H:
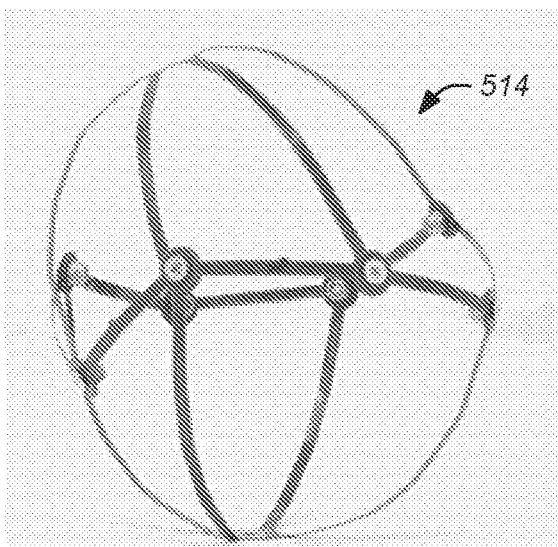

FIGS. 5F-5I show an exemplary Schonflies $D_{4d}$ (Orbifold 2*4) auxetic structure 514 operating as a universal joint. FIG. 5F shows the structure 514 in a closed position with the poles compressed together. FIG. 5G shows the structure 514 in an open position with the poles extended from one another. FIG. shows the structure 514 in a left bend with the poles exhibiting a leftward angle therebetween. FIG. 5H shows the structure 514 in a right bend with the poles exhibiting a rightward angle therebetween. The variation in the relative positions of the poles afforded by the structure 514 enables its use as a universal joint coupling rotation between separate rotating bodies coupled to each pole of the structure 514.

Figure 5I:
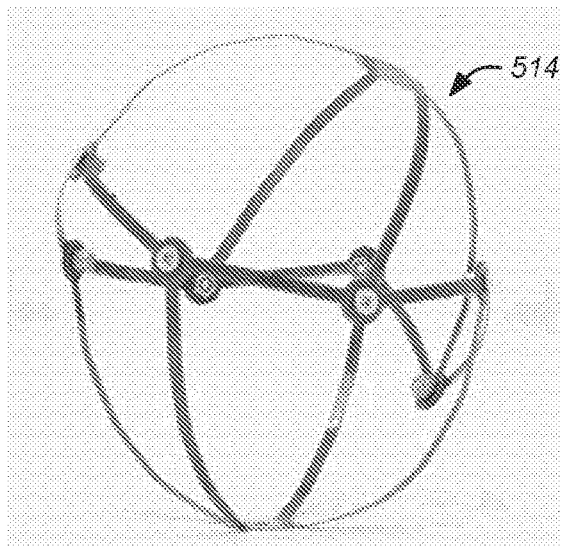
Figure 5K:
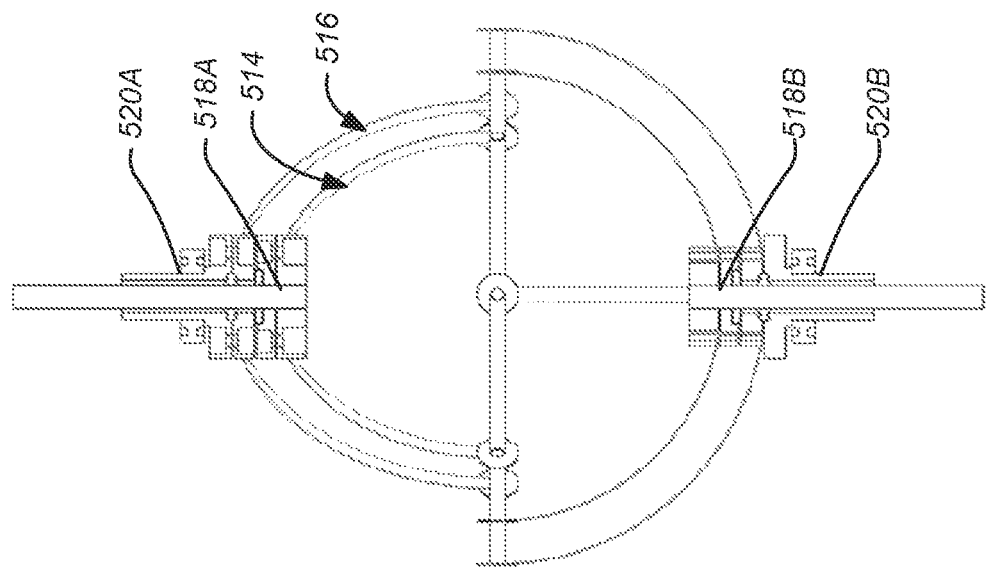
FIG. 5K shows a cross section of the exemplary Schonflies $D_{4d}$ (Orbifold 2*4) auxetic of FIG. 5J.
Figure 5J:
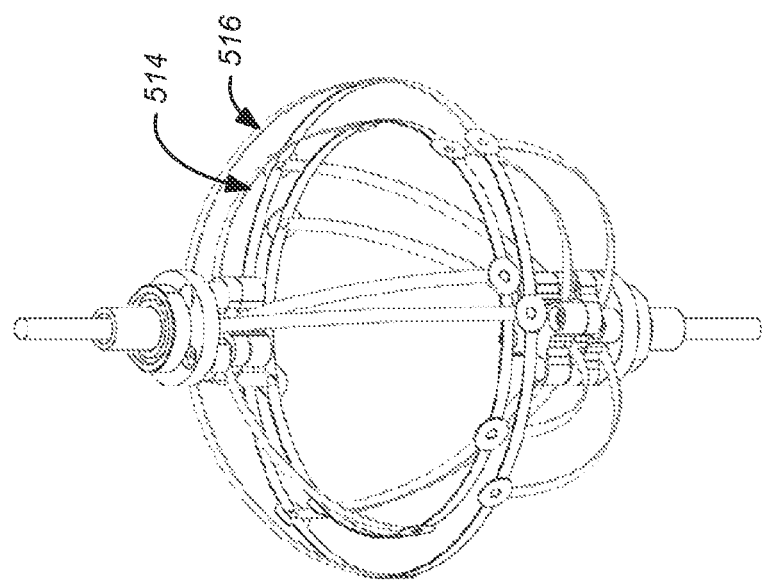
FIG. 5J shows an exemplary Schonflies $D_{4d}$ (Orbifold 2*4) auxetic of FIGS. 5F-5I (8) disposed within another of the same structure to form a nested U-joint.

FIG. 5J shows the exemplary Schonflies $D_{4d}$ (Orbifold 2*4) auxetic structure 514 of FIGS. 5F-5I disposed within another of the same structure 516 to form a nested universal joint. FIG. 5K shows a cross section of the exemplary Schonflies (Orbifold 2*4) auxetic structure 514 of FIG. 5J. Each separate structure 514, 516 has separate but concentric input and output shafts affixed to its poles. The inner structure 514 has inner input shaft 518A affixed to the upper pole (sandwiched between clamped interface) and an inner output shaft 518E affixed to the lower pole (sandwiched between clamped interface). The outer structure 516 has outer input shaft 520A affixed to the upper pole (sandwiched between clamped interface) and an outer output shaft 520B affixed to the lower pole (sandwiched between clamped interface).

6.0 Schonflies $S_{2n}$ (Orbifold Nx) Axial Auxetic Structures

FIGS. 6A and 6B show an axial auxetic structure of Schonflies $S_{2n}$(Orbifold Nx) schematically illustrating induced expansion and an example embodiment, respectively. The spheroid shape 602 is formed from a pair of opposing crown elements 608A, 608B each having a common number of extensions (e.g. four) from a central hub at each pole of the spheroid shape. Each of the pair of opposing crown elements 608A, 608B have the central hub disposed at opposite poles of the spheroid surface such that ends of the extensions interlace. In addition, the auxetic structure 600 of FIG. 6A comprises a pattern of arrowhead shapes 604 each tiled around the equator of the spheroid shape 602. Each arrowhead shape 604 is formed from four elements 606A, 606B, 606C, 606D. The tail elements 606C, 606D of each arrowhead shape 604 are joined together along with an extension of one of the crown elements 608A, 608B. In addition, tail elements 606C, 606D of each arrowhead shape 604 extend equatorially to couple to the next adjacent extension of the opposing crown element 608A, 608B.

The structure 600 can be formed using any number of adjacent arrowhead shapes linked together as described above. As the tension is applied across the poles 610A, 610B, the opposing crown elements 608A, 608B pull to force the tail elements 606C, 606D to become collinear enlarging the equator of the spheroid shape 602 consistent with a negative Poisson's ratio.

Figure 6C:
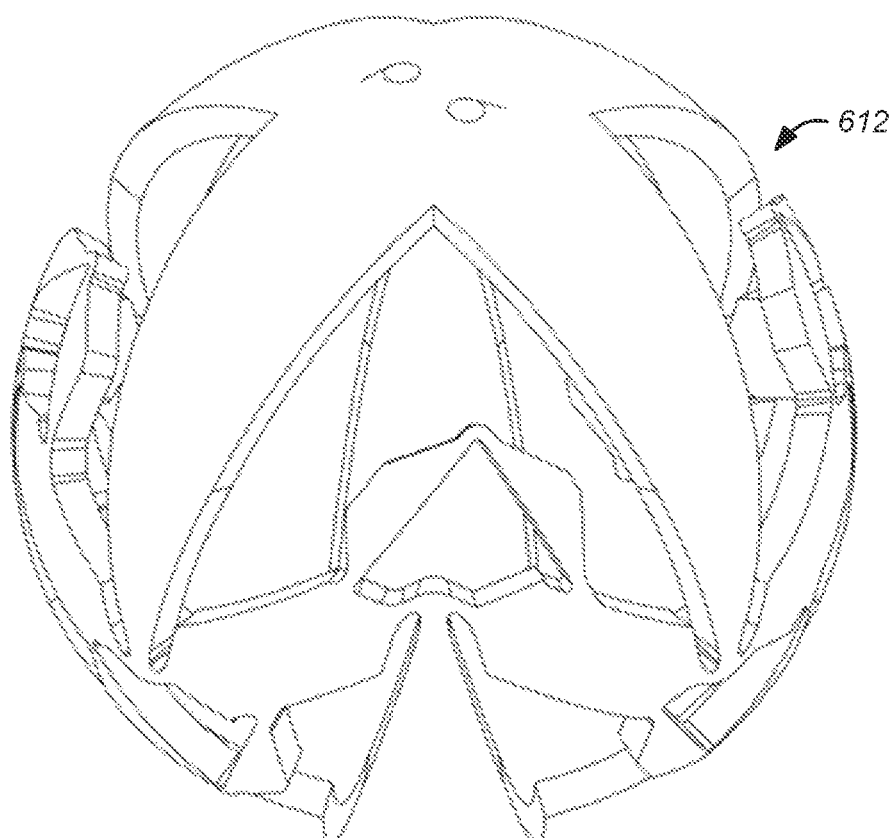
FIGS. 6C to 6E perspective, front, angled views, respectively, of an exemplary axial auxetic structure of Schonflies $S_{2n}$ (Orbifold Nx)
Figure 6D:
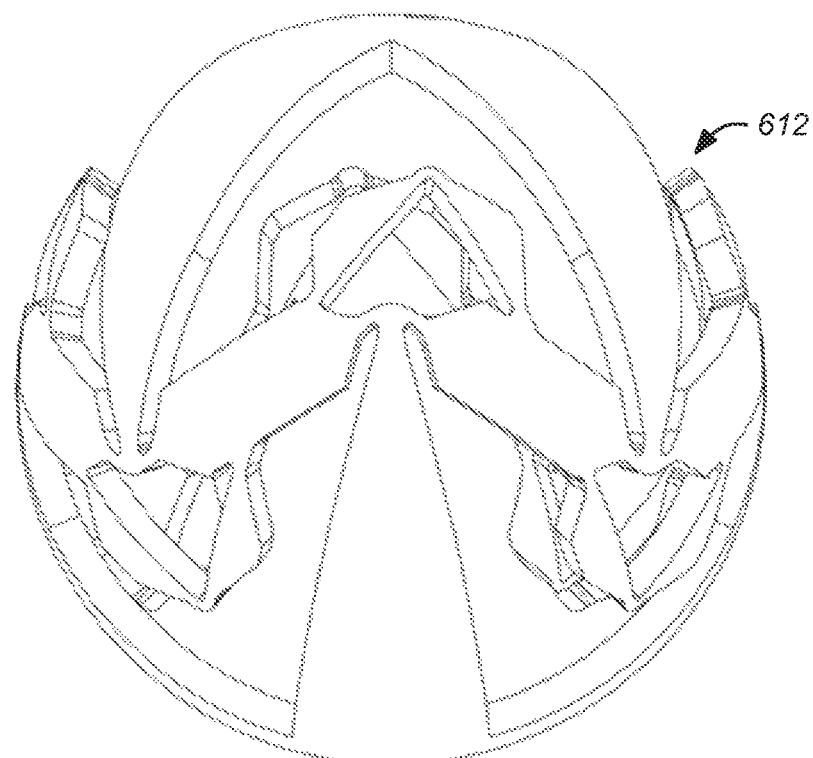
Figure 6E:
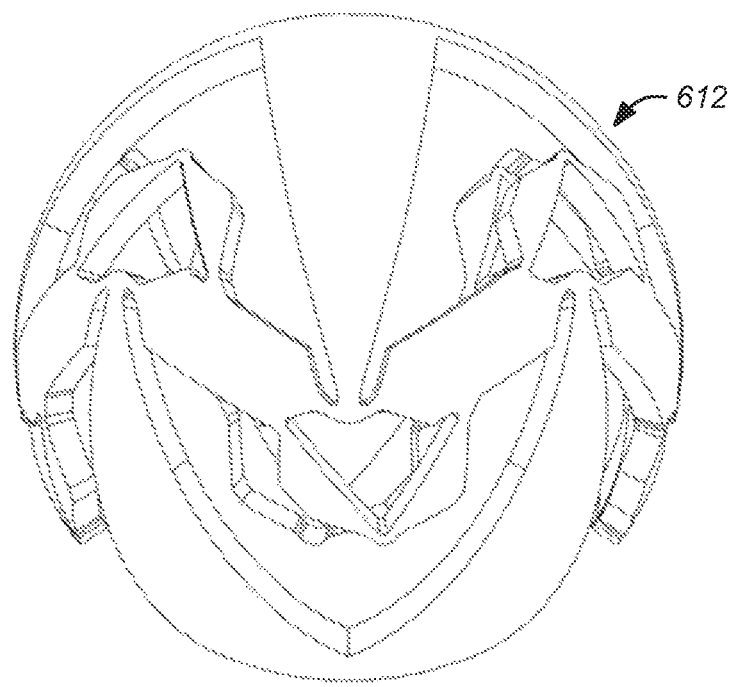

FIGS. 6C to 6E perspective, front, angled views, respectively, of an exemplary axial auxetic structure 612 of Schonflies $S_{2n}$ (Orbifold Nx), This example structure 612 of FIG. 6B is a unitary structure as can be produced using 3D printing. Joints between elements are formed having hinge lines normal to the plane of the spheroid surface.

Figure 6F:
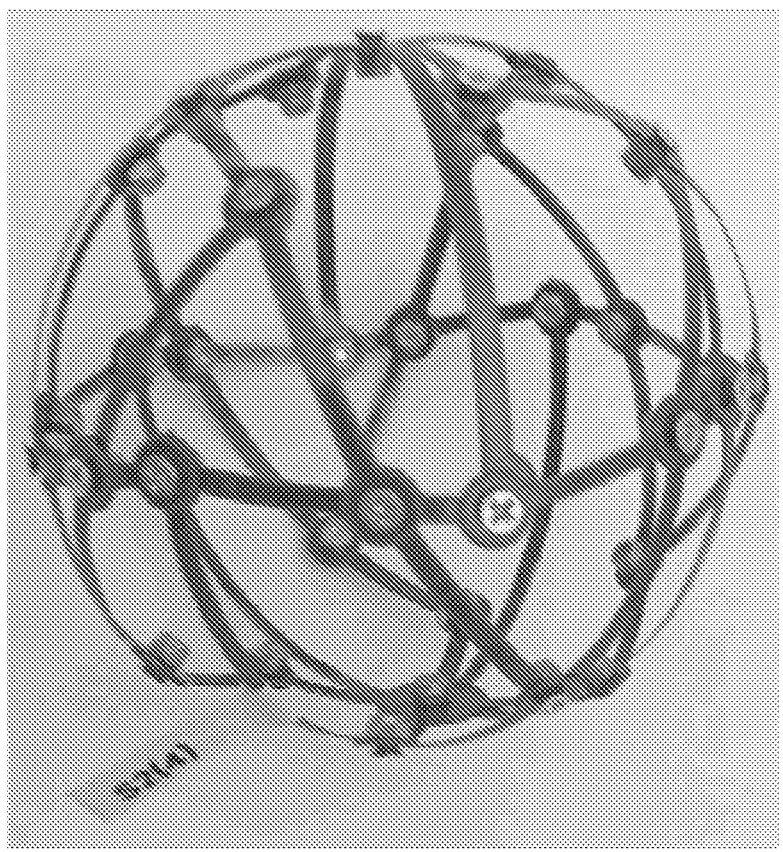
FIG. 6F shows an exemplary axial auxetic structure of Schonflies $S_{2n}$ (Orbifold Nx)
Figure 7A:
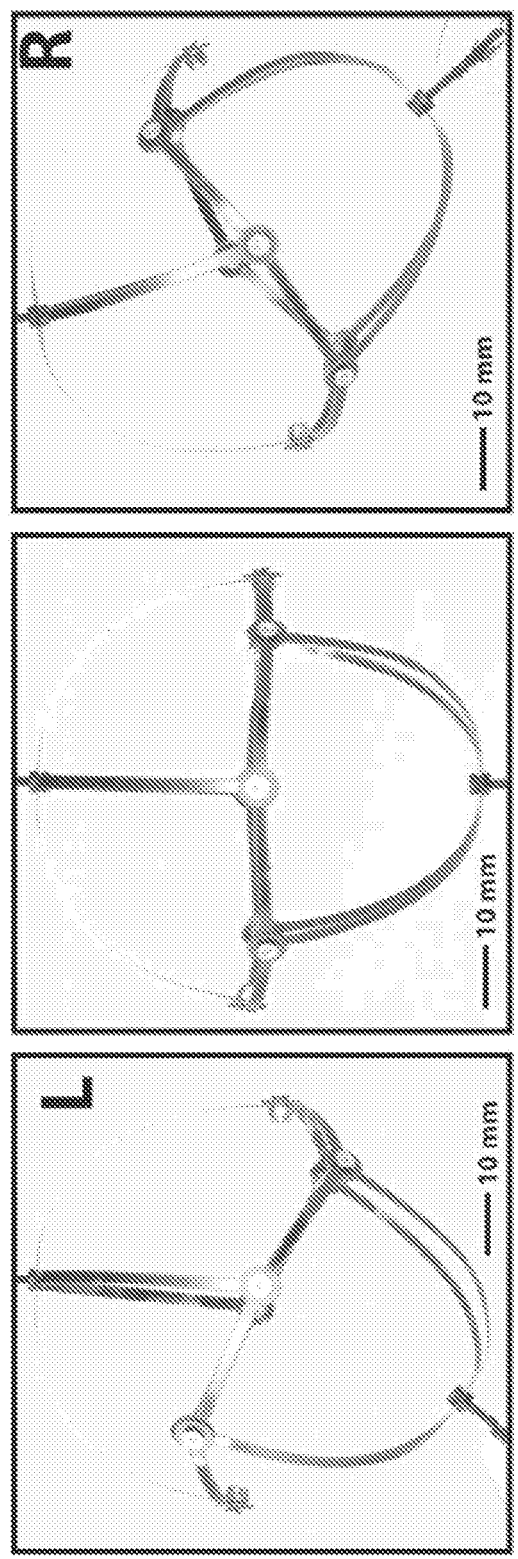
FIG. 7A shows an exemplary Schonflies $D_{4d}$ (Orbifold 2*4) auxetic structure operating as a universal joint with bends showing interaxial torque transmission capability.

FIG. 6F shows an exemplary axial auxetic structure of Schonflies $S_{2n}$ (Orbifold Nx). The auxetic structure of FIG. 6F shows a tiling which has the ability to be locked. The pattern around the equator of the sphere has S2.4 symmetry in the Schonflies flies notation and NX symmetry in orbifold notation. The equator of the structure has alternating offset arrowhead auxetics. The points of the arrow heads can be optionally attached via a 2-bar linkage to the nearest pole of the sphere. Of the linkages connecting the arrowheads to the poles are rotated, the sphere switches form movable state to a more rigid state. This ability to use twisting actions about the equator to change stiffness would allow motorized or actuated cells to be programmatically adjusted by electric signals. This rotationally adjusted stiffness also allows for building structures with stiffness capable of manual or automatic tuning by rotating a mechanism on the surface should the structures connecting the arrow heads to each pole be connected to each other to form a single degree of freedom mechanism at the pole. Alternatively the single degree of freedom mechanism at each pole can be connected together to from a unified single degree of freedom structure which can be used for manually and automatically changing the locked state of the structure, 7.0 Multiple Cell Axial Auxetic Structures FIG. 7A shows an exemplary Schonflies $D_{4d}$ (Orbifold 2*4) auxetic structure operating as a universal joint with bends showing interaxial torque transmission capability. These images are similar to FIGS. 5H and 5I showing bending across poles of the structure.

Figure 7B:
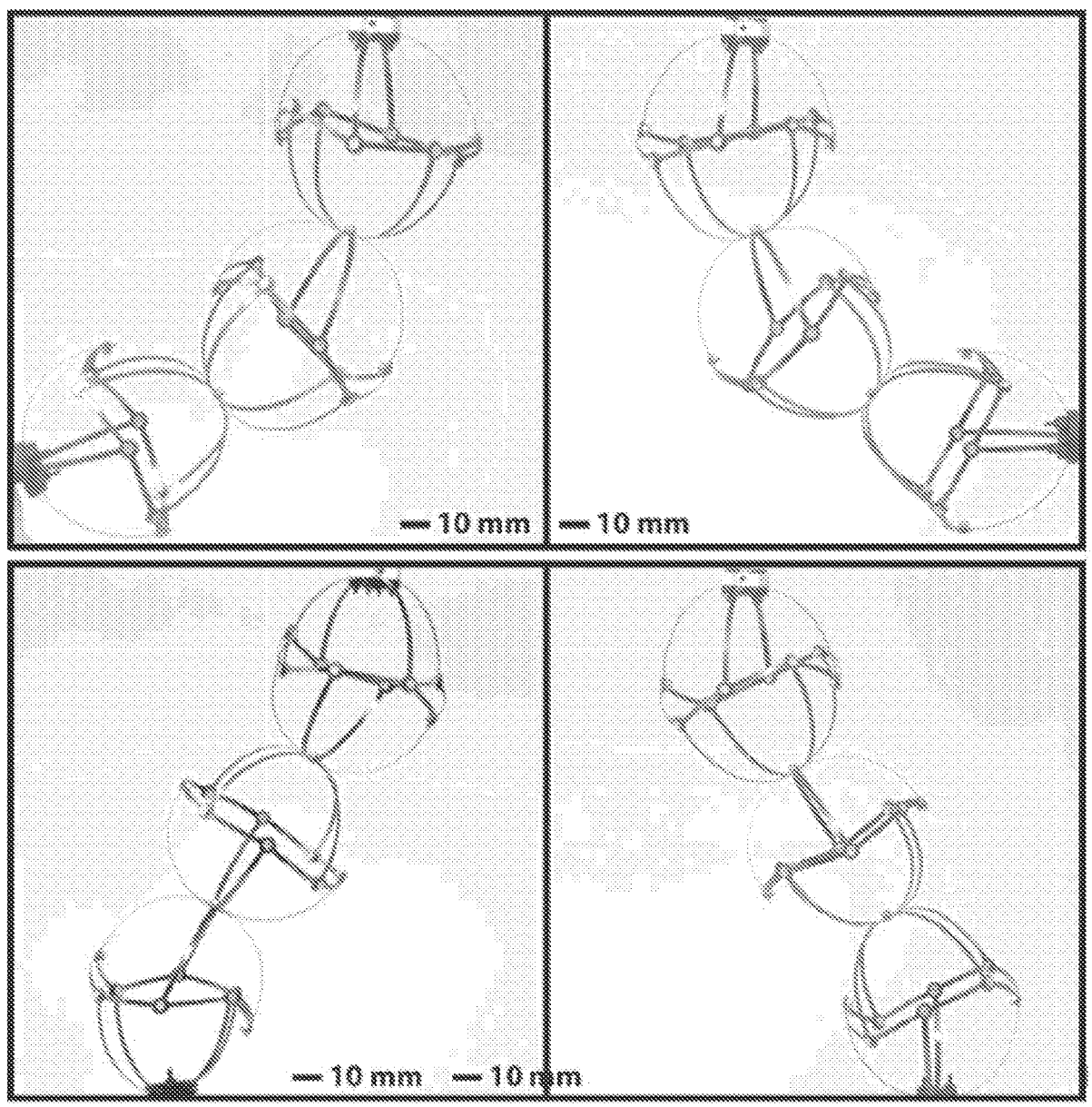
FIG. 7B shows an exemplary Schonflies $D_{4d}$ (Orbifold 2*4) auxetic structure formed from pole to pole serially coupled structures operating as a universal joint showing bending across the input and output axes.
Figure 7C:
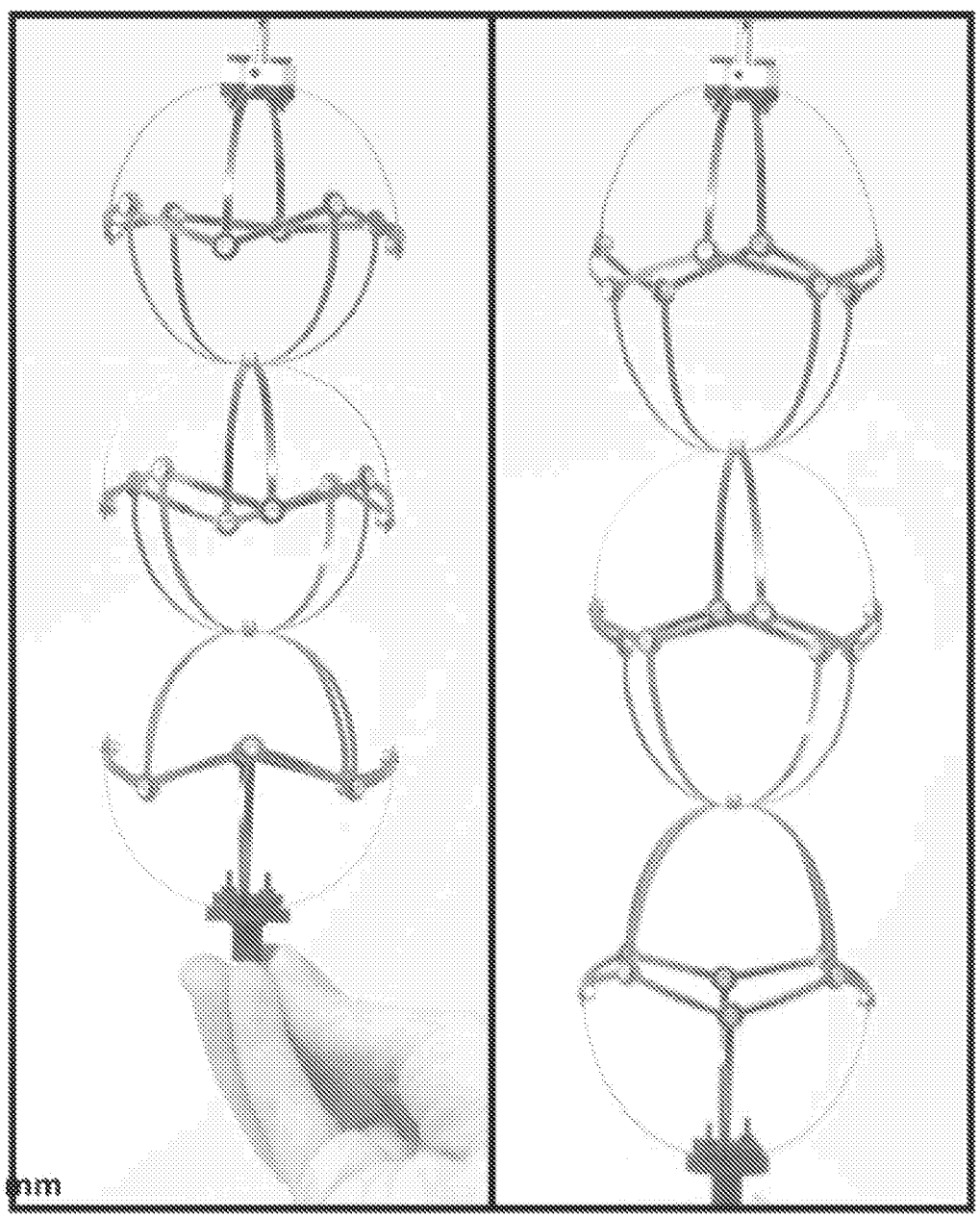
FIG. 7C shows an exemplary Schonflies $D_{4d}$ (Orbifold 2*4) auxetic structure formed from pole to pole serially coupled structures operating as a universal joint showing compression and tension across the input and output axes.

FIG. 7B shows an exemplary Schonflies $D_{4d}$ (Orbifold 2*4) auxetic structure formed from pole to pole serially coupled structures operating as a universal joint showing bending across the input and output axes. As shown a plurality of non-shearing auxetic axial Schonflies $D_{4d}$ (Orbifold 2*n) structures can be coupled pole to pole to form a universal joint across the serially connected poles. FIG. 7C shows an exemplary Schonflies $D_{4d}$ (Orbifold 2*4) auxetic structure formed from pole to pole serially coupled structures operating as a universal joint showing compression and tension across the input and output axes.

Figure 7D:
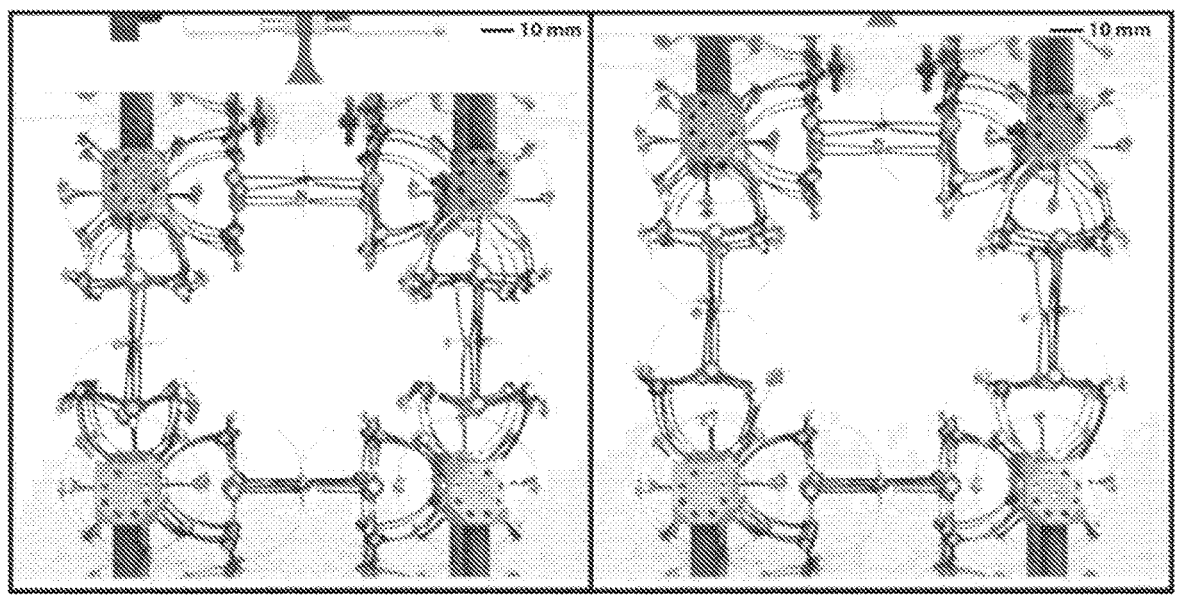
FIGS. 7D and 7E show an exemplary auxetic structure formed from pole to pole parallel coupled structures under applied tension and the stress to deformation plot, respectively.
Figure 7E:
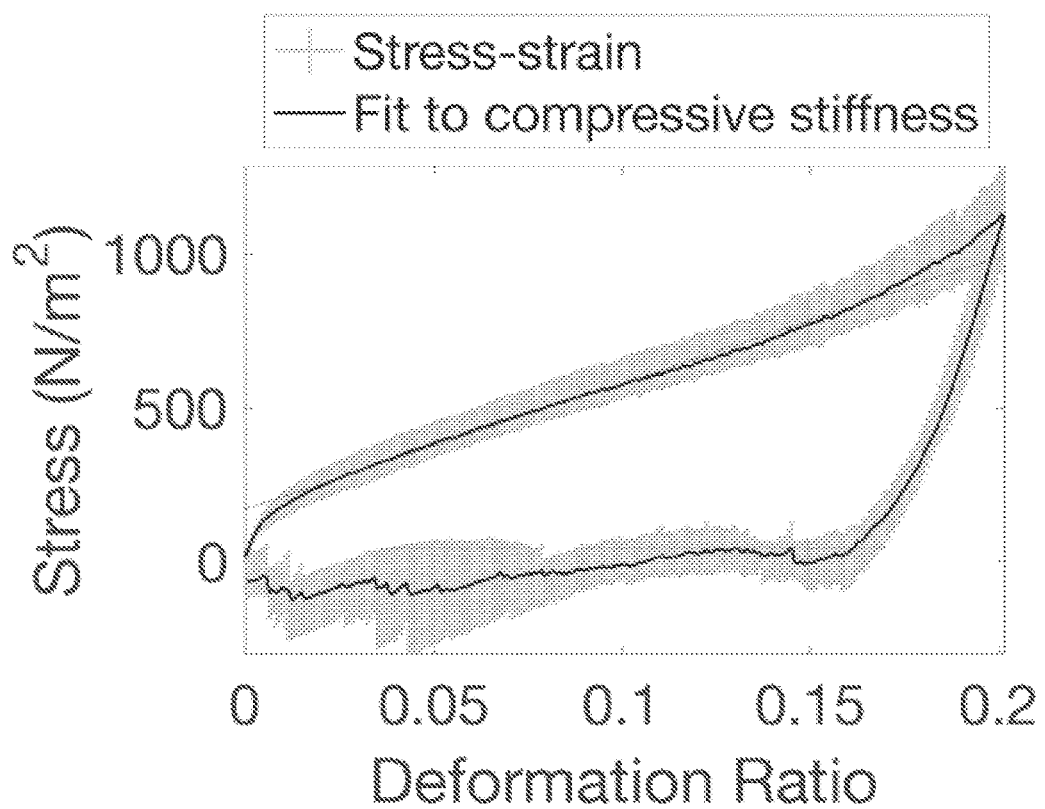
Figure 7F:
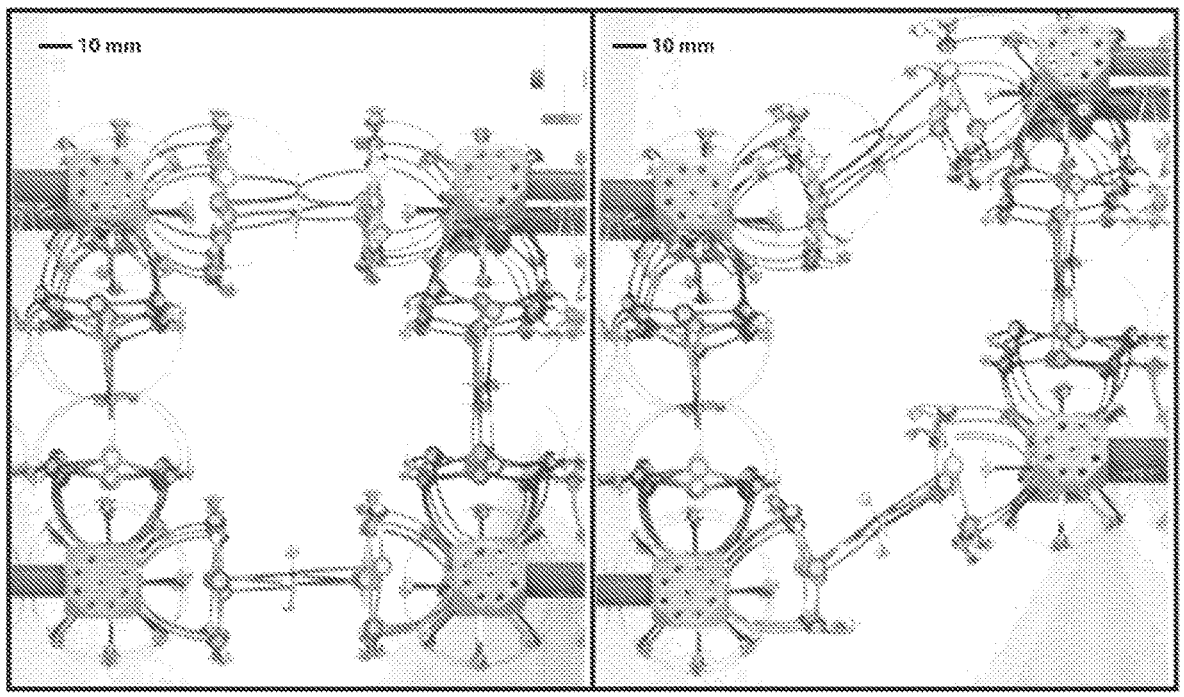
FIGS. 7F and 7G show an exemplary auxetic structure formed from pole to pole parallel coupled structures under applied shear and the stress to deformation plot, respectively.
Figure 7G:
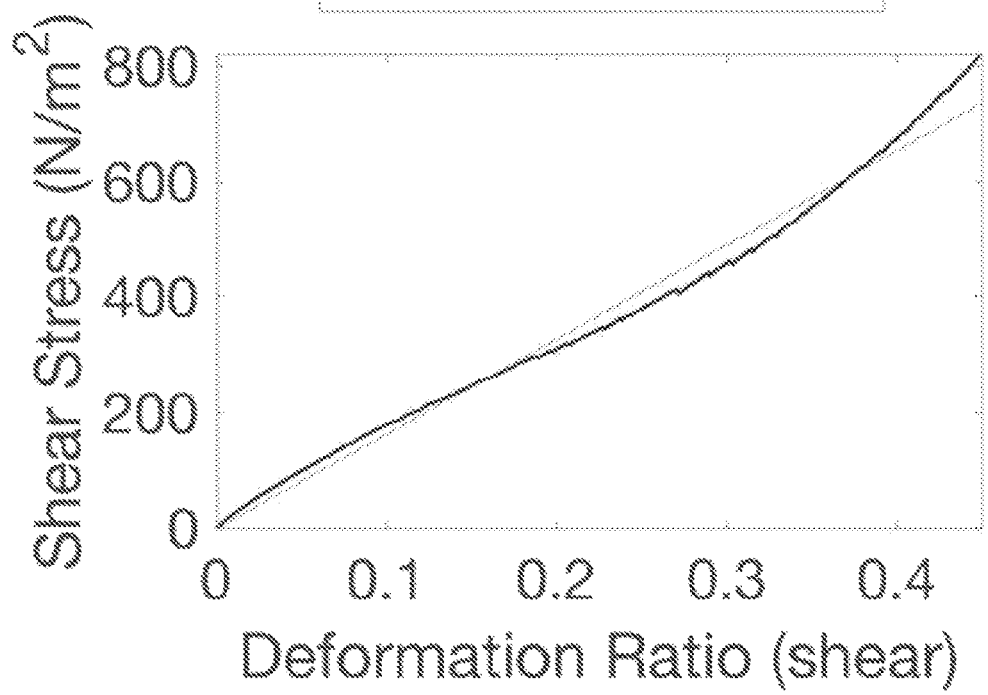

FIGS. 7D and 7E show an exemplary auxetic structure formed from pole to pole parallel coupled structures under applied tension and the stress to deformation plot, respectively. FIGS. 7F and 7G show an exemplary auxetic structure formed from pole to pole parallel coupled structures under applied shear and the stress to deformation plot, respectively.

Figure 8A:
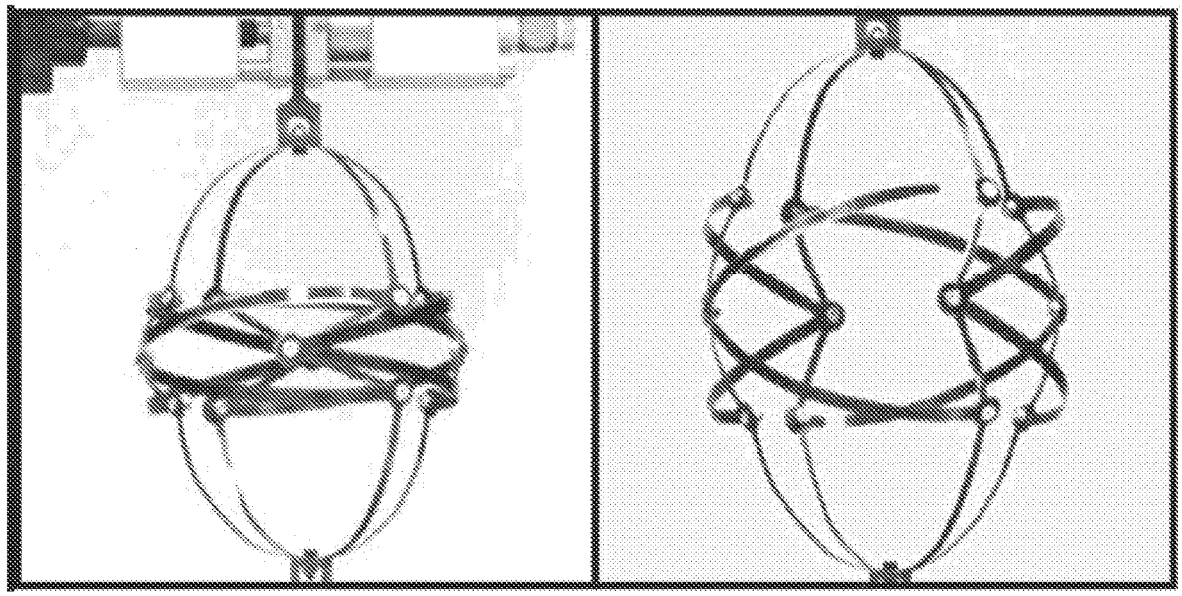
FIG. 8A shows an exemplary Schonflies $C_{nh}$ (Orbifold n*) auxetic structure in a first stable configuration of the auxetic regime beginning transition to a second stable configuration of the non-auxetic regime.
Figure 8B:
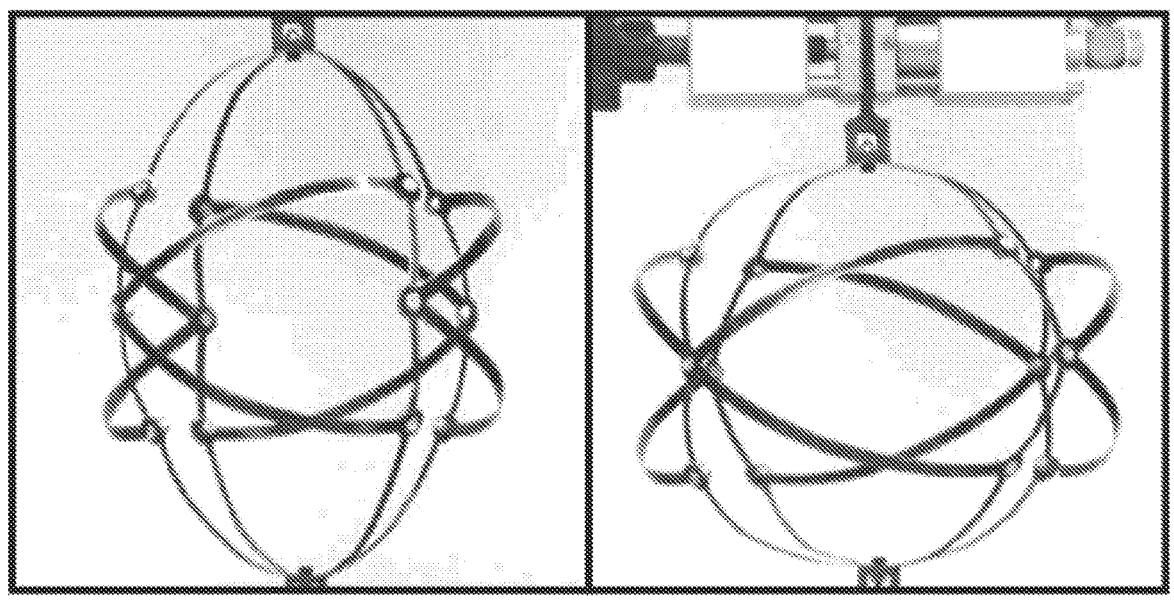
FIG. 8B shows the exemplary Schonflies $C_{nh}$ (Orbifold n*) auxetic structure of FIG. 8A completing transition to the second stable configuration of the non-auxetic regime.
Figure 8C:
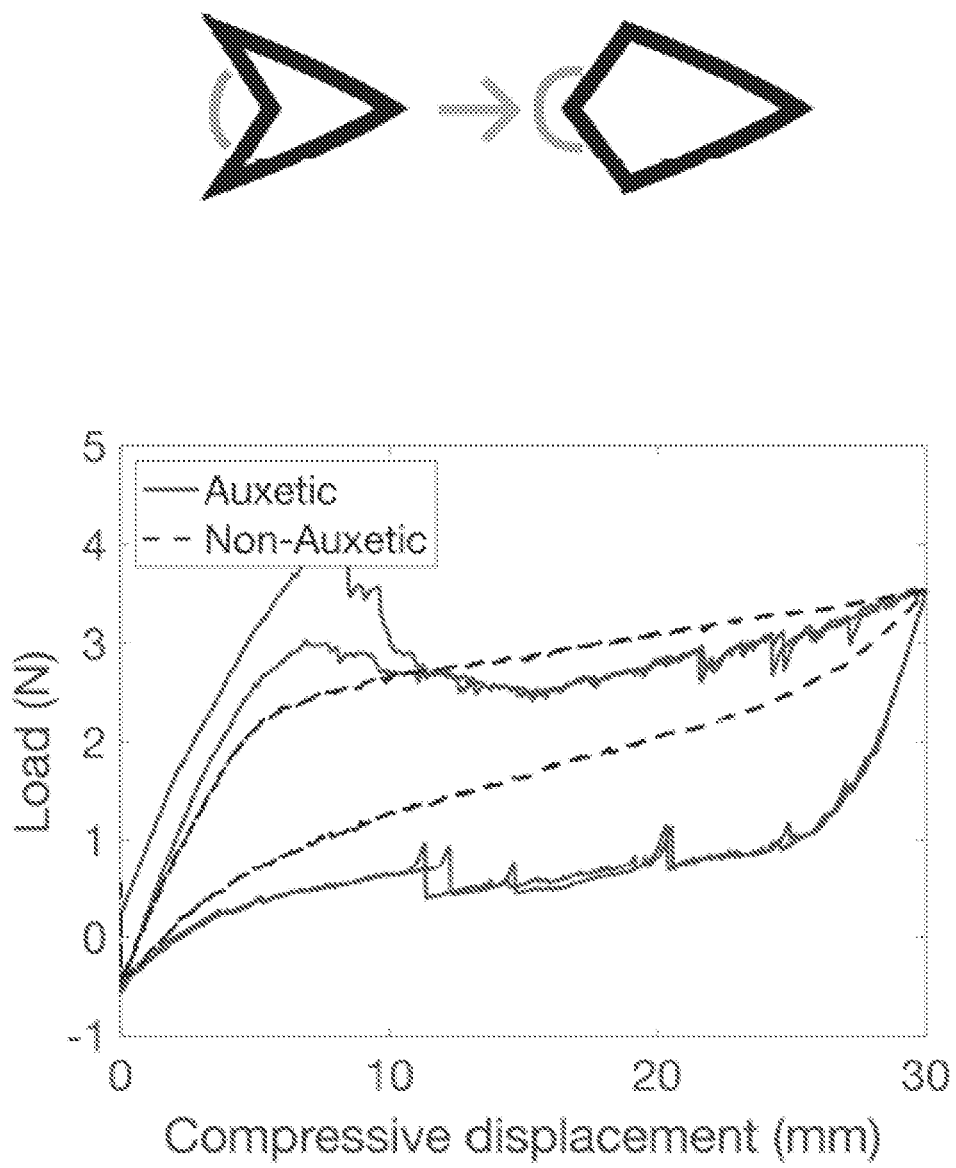
FIG. 8C shows a comparison of plots of the load to compressive displacement for both the auxitic and non-auxetic regimes of the exemplary auxetic structure of FIGS. 8A and 8B.

FIG. 8A shows an exemplary Schonflies $C_{nh}$ (Orbifold n*) auxetic structure in a first stable configuration of the auxetic regime beginning transition to a second stable configuration of the non-auxetic regime. FIG. 8B shows the exemplary Schonflies $C_{nh}$ (Orbifold auxetic structure of FIG. 8A completing transition to the second stable configuration of the non-auxetic regime. FIG. 8C shows a comparison of plots of the load to compressive displacement for both the auxetic and non-auxetic regimes of the exemplary auxetic structure of FIGS. 8A and 8B. The transition from auxetic to non-auxetic is illustrated as tail elements of the arrowhead shape move past a collinear alignment to form a rhomboid shape.

Figure 8D:
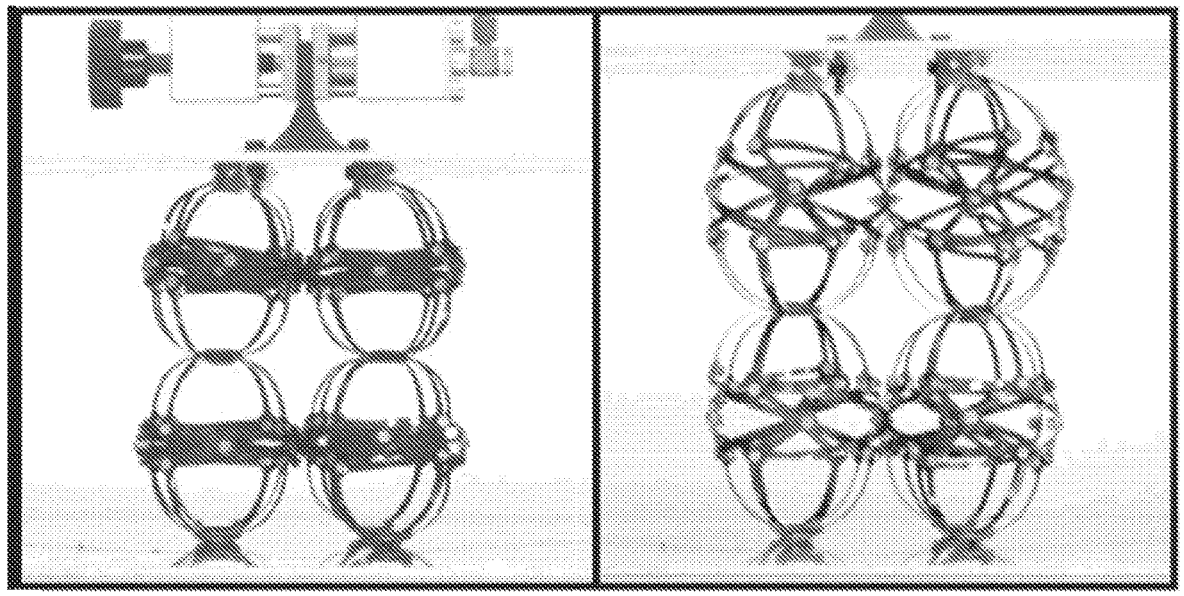
FIG. 8D shows an exemplary auxetic structure in a first stable configuration of the auxetic regime beginning transition to a second stable configuration of the non-auxetic regime.
Figure 8E:
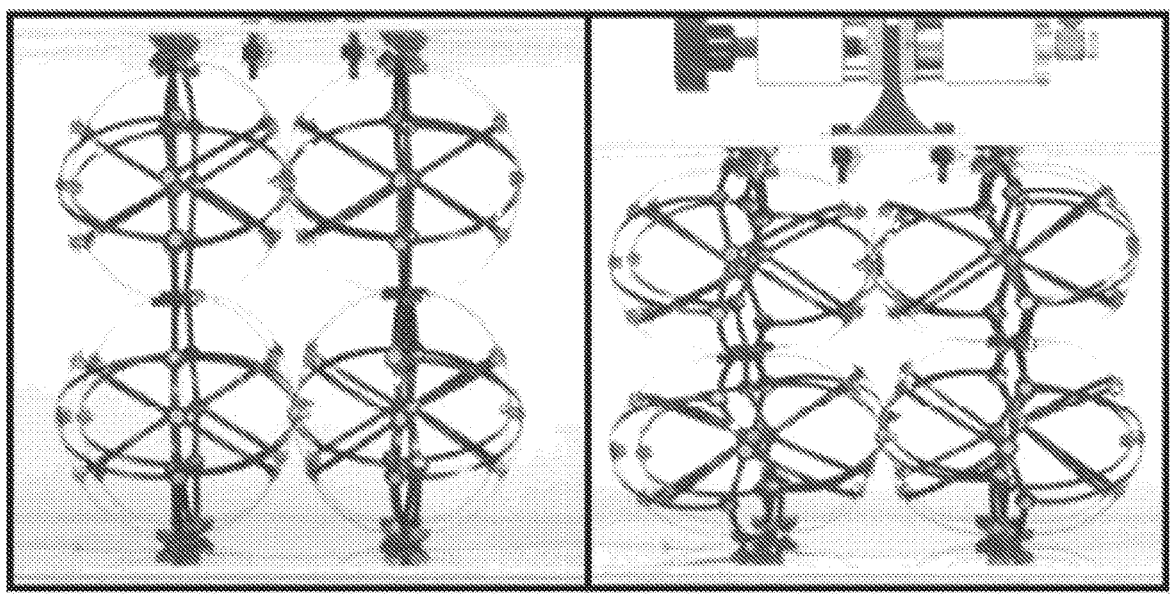
FIG. 8E shows the exemplary auxetic structure of FIG. 8D completing transition to the second stable configuration of the non-auxetic regime.
Figure 8F:
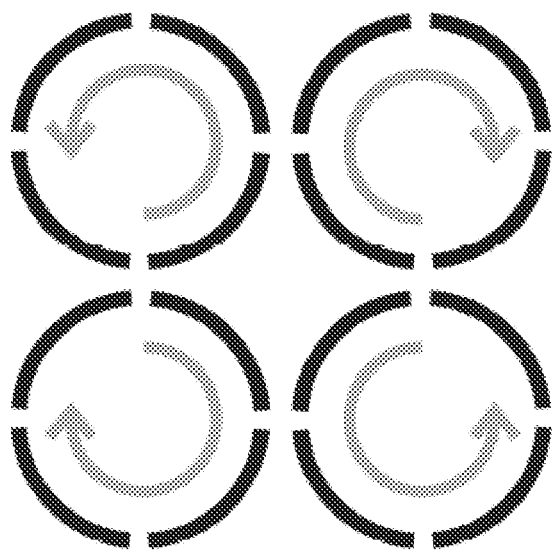
FIG. 8F shows a comparison of plots of the load to compressive displacement for both the auxitic and non-auxetic regimes of the exemplary auxetic structure of FIGS. 8D and 8E.
Figure 8F:
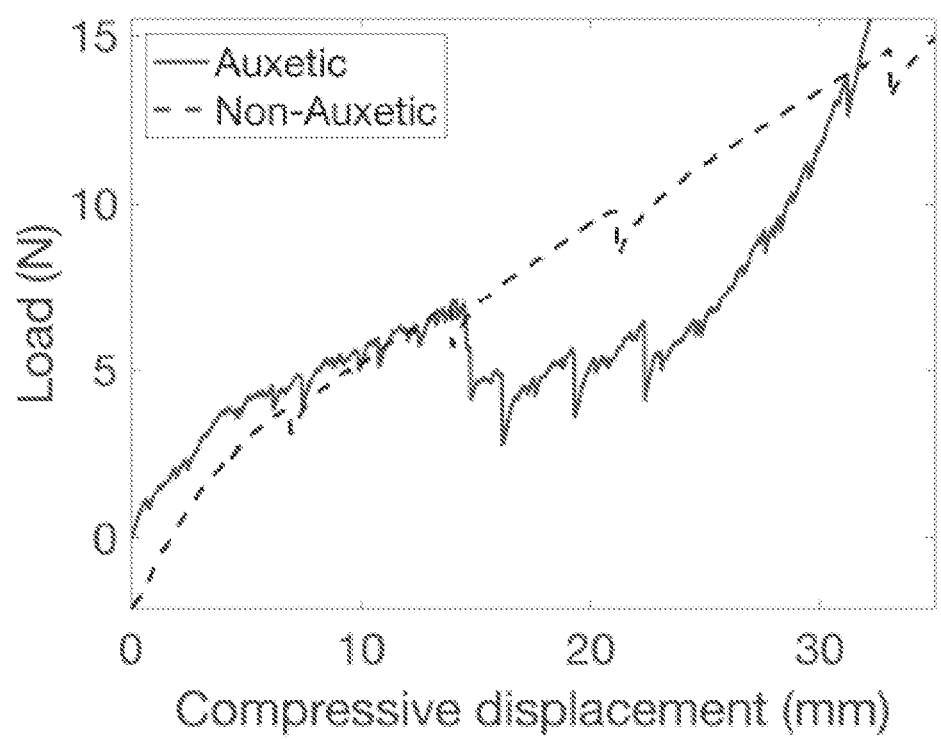

FIG. 8D shows an exemplary Schonflies $C_{nh}$ (Orbifold n*) auxetic structure in a first stable configuration of the auxetic regime beginning transition to a second stable configuration of the non-auxetic regime. The transition for each structure is induced by a movement of the tail elements rotation around the equator relative to the poles to change the closed arrowhead shapes to rhomboid shapes as previously described. FIG. 8E shows the exemplary auxetic structure of FIG. 8D completing transition to the second stable configuration of the non-auxetic regime. FIG. 8F shows a comparison of plots of the load to compressive displacement for both the auxetic and non-auxetic regimes of the exemplary auxetic structure of FIGS. 8D and 8E. The transition from auxetic to non-auxetic is illustrated by the counter rotation of each adjacent parallel connected structure and the same rotation of the diagonal structure as shown. Thus, each of the structures requiring the same rotation to transition to non-auxetic are identical, whereas the structures requiring an opposite rotation are mirror images, i.e. having the same design although the pattern of closed arrowhead shapes around the equator is reversed thereby requiting a reverse rotation to transition to non-auxetic.

The foregoing description, including the preferred embodiments of the invention, has been presented for the purposes of illustration and description. It is not intended to be exhaustive or to limit the invention to the precise form disclosed. Many modifications and variations are possible in light of the above teaching. The above specification provides a complete description of the apparatus, method and use of the invention.

What is claimed is:

1. An apparatus comprising:
a non-shearing axial auxetic structure including a spheroid surface having a pattern of repeating unit cells, each unit cell formed by four elements in a closed shape, each of the plurality of elements having two ends, where each of the two ends of each of the plurality of elements is coupled to one or more adjacent elements by a pivot joint, where a first pivot joint between two of the four elements couples to at least one first adjacent cell;
wherein the pattern of repeating unit cells has a contracted configuration and an expanded configuration, wherein a second pivot joint between the remaining two of the four elements couples to at least one second adjacent cell opposite the first adjacent cell and wherein the spheroid surface comprises an n* orbifold and the pattern of repeating unit cells comprises unit cells each formed of the four elements form a closed equatorial ring around the spheroid surface.

2. The apparatus of claim 1, wherein the closed shape comprises a rhomboid such that the remaining two of the four elements with the second pivot joint between form an interior angle less than 180 degrees.

3. The apparatus of claim 1, wherein the closed shape comprises an arrowhead such that the remaining two of the four elements with the second pivot joint between form an interior angle greater than 180 degrees.

4. The apparatus of claim 1, wherein the second pivot joint moves toward an interior of the closed shape in the contracted configuration and moves toward making the second pivot joint collinear with a third pivot joint and a fourth pivot joint of the closed shape in the expanded configuration.

5. The apparatus of claim 1, wherein equatorial twisting relative to poles of the spheroid surface induces switching of a Poission's ratio of the non-shearing auxetic axial structure.

6. An apparatus comprising:
a non-shearing axial auxetic structure including a spheroid surface having a pattern of repeating unit cells, each unit cell defined by a plurality of elements in a closed shape, each of the plurality of elements having two ends, where each of the two ends of the plurality of elements is coupled to one or more adjacent elements by a pivot joint, where the pattern of repeating unit cells has a contracted configuration and an expanded configuration;
wherein the non-shearing axial auxetic structure further comprises a pair of opposing crown elements each having a common number of extensions from a central hub, each of the pair of opposing crown elements having the central hub disposed at opposite poles of the spheroid surface such that ends of the extensions interlace and the end of each extension comprises an extension pivot joint coupled to adjacent extension links between both adjacent extensions of the opposing crown element.

7. The apparatus of claim 6, wherein the spheroid surface comprises an nx orbifold and the pattern of repeating unit cells comprises unit cells each formed of four elements in the closed shape where a first pivot joint is coupled between two of the four elements and a second pivot joint comprises the extension pivot joint such that a remaining two of the four elements is formed from a portion of the adjacent extension links and the two of the four elements have ends each coupled to a third and a fourth at a midpoint of the adjacent extension links.

8. The apparatus of claim 7, wherein the non-shearing auxetic axial structure comprises a universal joint across poles of the spheroid surface.

9. An apparatus comprising:
a non-shearing axial auxetic structure including a spheroid surface having a pattern of repeating unit cells, each unit cell formed by four elements in a closed shape, each of the plurality of elements having two ends, where each of the two ends of each of the plurality of elements is coupled to one or more adjacent elements by a pivot joint, where a first pivot joint between two of the four elements couples to at least one first adjacent cell and a second pivot joint between the remaining two of the four elements couples to at least one second adjacent cell opposite the first adjacent cell;
wherein the pattern of repeating unit cells has a contracted configuration and an expanded configuration and the pattern of repeating unit cells comprises unit cells each formed of the four elements where the first pivot joint of each unit cell is disposed at a pole of the spheroid surface and the second pivot joint between the remaining two of the four elements moves toward an equator of the spheroid surface in the expanded configuration and the non-shearing auxetic axial structure comprises a universal joint across poles of the spheroid surface.

10. An apparatus comprising:
a non-shearing axial auxetic structure including a spheroid surface having a pattern of repeating unit cells, each unit cell formed by four elements in a closed shape, each of the plurality of elements having two ends, where each of the two ends of each of the plurality of elements is coupled to one or more adjacent elements by a pivot joint, where a first pivot joint between two of the four elements couples to at least one first adjacent cell;
wherein the pattern of repeating unit cells has a contracted configuration and an expanded configuration, wherein a second pivot joint between the remaining two of the four elements couples to at least one second adjacent cell opposite the first adjacent cell, and wherein the spheroid surface comprises an 2*n orbifold and the pattern of repeating unit cells comprises unit cells each formed of the four elements where the first pivot joint of each unit cell is disposed at a pole of the spheroid surface and the second pivot joint between the remaining two of the four elements moves toward an equator of the spheroid surface in the expanded configuration.

11. The apparatus of claim 10, wherein the non-shearing auxetic axial structure comprises a universal joint across poles of the spheroid surface.

12. The apparatus of claim 10, wherein a second non-shearing auxetic axial structure is disposed within the non-shearing auxetic axial structure to form a pair of nested universal joints across poles of each spheroid surface.

13. The apparatus of claim 10, wherein one or more additional non-shearing auxetic axial structure are coupled pole to pole to the non-shearing auxetic axial structure to form a universal joint across serially connected poles of each spheroid surface.

* * * * *